United States Patent
Eich et al.

(10) Patent No.: US 7,151,990 B2
(45) Date of Patent: Dec. 19, 2006

(54) METHOD FOR CONTROLLING AN AUTOMATED GEARBOX, ELECTRONIC SAFETY SYSTEM AND ADAPTER PLUG

(75) Inventors: Juergen Eich, Buehl (DE); Klaus Henneberger, Buehl (DE); Andreas Maxon, Karlsruhe (DE)

(73) Assignee: Luk Lamellen und Kupplungsbau Beteiligungs KG, Buehl (DE)

( * ) Notice: Subject to any disclaimer, the term of this patent is extended or adjusted under 35 U.S.C. 154(b) by 0 days.

(21) Appl. No.: 11/268,234

(22) Filed: Nov. 7, 2005

(65) Prior Publication Data

US 2006/0080019 A1   Apr. 13, 2006

Related U.S. Application Data

(63) Continuation of application No. 10/487,635, filed as application No. PCT/DE02/02977 on Aug. 14, 2002.

(30) Foreign Application Priority Data

Aug. 24, 2001   (DE) ................ 101 41 611

(51) Int. Cl.
*F16H 61/12*   (2006.01)
*G06F 19/00*   (2006.01)

(52) U.S. Cl. .......................... 701/51; 701/29
(58) Field of Classification Search .............. None
See application file for complete search history.

(56) References Cited

U.S. PATENT DOCUMENTS

| | | | |
|---|---|---|---|
| 4,690,475 A | 9/1987 | McElroy | 439/502 |
| 4,694,408 A | 9/1987 | Zaleski | 701/33 |
| 5,047,944 A | 9/1991 | Ishikawa et al. | 701/114 |
| 5,532,927 A | 7/1996 | Pink et al. | 701/34 |
| 5,778,330 A | 7/1998 | McKee | 701/62 |
| 5,966,305 A | 10/1999 | Watari et al. | 700/82 |
| 6,243,629 B1* | 6/2001 | Sugimoto et al. | 701/29 |
| 2003/0216848 A1 | 11/2003 | Katrak et al. | 701/54 |

FOREIGN PATENT DOCUMENTS

| | | |
|---|---|---|
| DE | 19736931 | 3/1999 |
| EP | 601729 | 6/1994 |
| WO | WO 96/25612 | 8/1996 |

* cited by examiner

*Primary Examiner*—Michael J. Zanelli
(74) *Attorney, Agent, or Firm*—Davidson, Davidson & Kappel, LLC

(57) ABSTRACT

A method for controlling an automated gearbox of a motor vehicle. An electronic control unit controls pre-determined functionalities, and especially pre-determined functionalities of the automated gearbox. Functional software runs on a main processor of the control unit, controlling pre-determined functionalities of the motor vehicle and especially the automated gearbox. An electronic safety system is able to determine safety-critical operating conditions of the motor vehicle in advance, and includes a redundant processor and monitoring software.

16 Claims, 15 Drawing Sheets

METHOD FOR CONTROLLING AN AUTOMATED GEARBOX, ELECTRONIC SAFETY SYSTEM AND ADAPTER PLUG

CROSS-REFERENCE TO RELATED APPLICATIONS

This is a continuation of U.S. Pat. Ser. No. 10/487,635, a National Phase Application of PCT Application No. PCT/DE02/02977 filed Aug. 14, 2002, both of which are hereby incorporated by reference herein.

BACKGROUND

The present invention relates to a method for controlling a automated gearbox, an electronic safety system and an adapter plug.

Methods for controlling an automated gearbox, electronic safety systems and adapter plugs are already known.

SUMMARY OF THE INVENTION

An object of the present invention is to provide a novel method for controlling an automated gearbox, a novel electronic safety system and a novel adapter plug, that is, a novel method for controlling an automated gearbox or an electronic safety system or an adapter plug.

The present invention provides an electronic safety system which has at least one of the features that are described in the following description or the claims or are shown in the figures.

The present invention also provides an adapter plug or adapter connector, which has at least one of the features that are described in the following description or the claims or are shown in the figures.

According to the present invention, in particular a method for controlling an automated gearbox of a motor vehicle is proposed, in which in normal operation of the motor vehicle a wire harness connector is coupled with a control unit connector, which produces a plurality of contact connections between the wire harness and the electronic control unit. In conjunction with initial start of the automated gearbox or predefined components of the motor vehicle, an adapter plug is inserted between a wire harness plug connector linked to the wire harness and a control unit connector. The adapter plug interrupts part of the contact connections.

Connectors may be in particular plugs or plug sockets or the like, and the term "adapter plug" as used herein, may refer to any intermediate connector, including a plug, a socket, a cable, or any other electrical connecting device.

In particular, the present invention provides an electronic control unit to control predefined functionalities, such as functionalities of the automated gearbox. This electronic control unit is able to control the functionalities of various or individual components. For example, without the present invention being limited thereby, such an electronic control unit is also able to control clutch functionalities or engine functionalities. For example, the electronic control unit may be a clutch control unit or a transmission control unit or an engine control unit or a master control unit or the like. The present invention is not intended to be limited by these forms of the control unit, however. The electronic control unit has a main processor, on which function software may run which is able to control the predefined functionalities of the motor vehicle or of the automated gearbox or the like.

Also provided is an electronic safety system, which is able to determine safety-critical operating conditions of the motor vehicle in advance. The electronic safety system has a redundant processor. The electronic safety system also has monitoring software.

An exemplary electronic safety system is offered by the applicant under the name "Intelligent Safety Monitoring System (ISM)."

The intermediate connector may be in particular an adapter plug or an adapter cable, or may have such an adapter plug or adapter cable.

In a preferred design, this intermediate connector is designed in such a way that it interrupts at least part of the connections between the wire harness plug connector and the control unit connector which would exist in a direct connection between the wire harness plug connector and the control unit connector. The intermediate connector may be designed in such a way that all or part of these connections are interrupted.

In a preferred design, at least two contact connections which are able to transmit signals in normal operation are interrupted by the intermediate connector. Particularly preferred are two contact connections which are able to transmit signals in normal operation and which are independent of each other are interrupted by the intermediate connector.

In a particularly preferred design, when the intermediate connector is installed, driving operation of the motor vehicle is possible only to a limited extent or not at all.

This may be effected in particular through appropriate adjustment of the intermediate connector or adapter plug using appropriate software.

The present invention provides a method for controlling an automated gearbox of a motor vehicle comprising:

providing an electronic control unit having a main processor;

controlling a predefined functionality of the motor vehicle using a function software running on the main processor under predefined conditions;

detecting a safety-critical operating state of the motor vehicle in advance using an electronic safety system having a redundant processor and a monitoring software;

performing a startup of the electronic control unit; and in conjunction with the startup, at least partially deactivating the monitoring software, and activating a substitute monitoring software.

According to the present invention, in the course of the initial start of the electronic control unit, the monitoring software is at least partially deactivated, and instead substitute monitoring software is activated.

The present invention provides a method for controlling an automated gearbox of a motor vehicle comprising:

providing an electronic control unit having a main processor;

controlling a predefined functionality of the automated gearbox using a function software running on the main processor under predefined conditions;

detecting a safety-critical operating state of the motor vehicle in advance using an electronic safety system having a redundant processor and a monitoring software;

monitoring at least one of a functionality of the main processor and a functionality of a predefined process running on the main processor during normal operation using the monitoring software;

determining whether a predefined impairment of a functions exists;

wherein, if a predefined impairment is determined to exist during normal operation, performing at least one of a shut-off of a final stage of at least one actuator, and a reset of the electronic control unit;

performing a startup of the electronic control unit; and in conjunction with the startup, transmitting a signal that suppresses, during the startup, the at least one of the shutoff of the final stage and the reset of the electronic control unit caused by the determination of the impairment.

According to the present invention, it is provided in particular that by using the monitoring software in normal operation, the functionality of the main processor and/or of predefined processes running on the main processor is monitored, and information is conveyed as to whether predefined impairments of functions exist. In particular, in normal operation of the vehicle or of the control unit the final stage of at least one actuator or of the control unit is shut off and/or a reset of the electronic control unit is produced when such an impairment of functions has been detected. In conjunction with the start of the motor vehicle, or of at least one predefined component of the motor vehicle, and in particular the electronic control unit, during start a signal causes a shut-off of the final stages, which is triggered by detection of an error, and/or a reset of the control unit is suppressed. The signal which causes the shut-off of the final stages or suppresses a reset of the ASG control unit in the manner described above may be output for example by an electronic tester.

Particularly preferred is also the combination of the aforementioned designs, so that by using a tester or a signal output by a tester it is possible to switch over from the monitoring software to the substitute monitoring software and/or vice versa.

In a preferred embodiment, the substitute monitoring software is designed so that it is unable to shut off the final stages, or prevents such a shut-off. Furthermore, this substitute monitoring software is preferably designed so that it makes correct communication possible between a monitoring processor and the main processor or between the monitoring processor and substitute monitoring software stored in the main processor.

In particular, the monitoring software is designed so that it prevents a reset of the control unit.

A particularly preferred design includes the provision that in normal operation the monitoring software and the monitoring processor check each other through a question-and-answer routine. This question-and-answer routine is preferably designed so that the monitoring processor sends predefined questions to the monitoring software, which is particularly preferably stored in the main processor, and receives corresponding responses from this monitoring software. A particularly preferred provision is that predefined desired responses are stored in the monitoring processor, and the monitoring processor indicates an error if the desired responses do not match the actual responses.

A particularly preferred design includes the provision that the monitoring software recalls the responses or corresponding characteristic values from the memory of the electronic controller, in particular an ASG control unit.

A particularly preferred provision is that in conjunction with a start of the motor vehicle or at least one of its components, such as the ASG control unit, or in conjunction with a shop test, correct responses are temporarily written into the memory of the electronic control unit. This writing of the correct responses may be produced for example using an external electronic tester.

In a preferred design, in conjunction with the conclusion of the startup, predefined memory contents of the control unit, such as an ASG control unit, are modified and in particular are overwritten.

A particularly preferred provision is that such memory contents are correct answers, which are called up by the monitoring software when the monitoring processor directs questions to the monitoring software or the main processor in conjunction with the start or in conjunction with a shop routine.

It is particularly preferred that, in conjunction with the startup, a signal link is established between the electronic control unit and an external electronic tester.

An electronic tester is in particular a hand-held tester.

A particularly preferred provision is that, after a normal completion of the start and/or of a shop test, or when communication between an electronic control unit and an electronic tester is lost, predefined memory contents of the control unit are overwritten.

A particularly preferred provision is that in such situations a reset of the control unit is triggered. In particular in conjunction with such a reset, memory contents of the control unit may also be overwritten or modified.

It is particularly preferred that, in conjunction with a reset of the electronic control unit and/or after a normal completion of the start and/or of a shop test, and/or if communication is lost between the electronic tester and the electronic control unit after a start and/or a shop test, the monitoring software is reactivated and the substitute monitoring software is deactivated or erased.

A particularly preferred provision is that the modified memory contents are neutral information.

The present invention provides a method for controlling an automated gearbox of a motor vehicle comprising:

providing an electronic control unit having a main processor;

controlling a predefined functionality of the automated gearbox using a function software running on the main processor under predefined conditions;

detecting a safety-critical operating state of the motor vehicle in advance using an electronic safety system having a redundant processor and a monitoring software;

providing an error message upon detection of a predefined impairment of the functionality by the electronic safety system; and at least limiting a monitoring activity of at least one the electronic safety system and the monitoring software and/or providing an error message upon detection of a predefined impairment of the functionality by the electronic safety system only if the electronic safety system recognizes an error when the control unit is not in an initialization phase.

According to the present invention, it is provided in particular that the electronic safety system displays an error message if it detects predefined impairments of functions, this monitoring activity or this displaying of errors by the electronic safety system and/or its monitoring software being at least limited if it is reported to the electronic safety system that the electronic control unit is in an initialization phase.

According to the present invention, it is provided in particular that the electronic safety system assumes its monitoring activity to the full extent after a delay; i.e., that it first waits for the completion of the initialization phase of the control unit before this monitoring activity is performed in its entirety.

The error that is displayed when predefined impairments of functions are detected, in particular outside of the initialization phase of the control unit, may be signaled in particular in such a way that a reset of the control unit is triggered, and/or in such a way that the final stages of actuators of this control unit are shut off, or in some other manner.

In a particularly preferred design, in the initialization phase of the control unit the final stages of these actuators are shut off right from the start.

Preferably in the initialization phase of the control unit at least one signal is sent to the electronic safety system indicating that the electronic control unit is in the initialization phase.

It is particularly preferred that this signal may be in particular a type of permanent signal that is emitted constantly or at certain time intervals, in particular short intervals, when the electronic control unit is in the initialization phase.

In conjunction with the present invention, such an indication of the initialization phase, occurring constantly or at short time intervals, is also referred to in particular as active indication.

A particularly preferred provision is that this signal, which indicates that the electronic control unit is in the initialization phase, is deleted from the electronic safety system after reception. A preferred provision is that the electronic safety system assumes its full monitoring activity and/or, in the event that errors are detected, indicates these errors, when it no longer receives the signal that indicates the initialization phase of the control unit, in particular continuously or at predefined time intervals that are shorter than a predefined limiting time interval. A preferred provision is that in this case the final stages of the actuators of the automated gearbox are enabled again, if they were shut off earlier at the beginning of the initialization phase.

In a preferred design, the signal that indicates to the electronic safety system that the electronic control unit is in the initialization phase is emitted and/or generated using the function software.

A particularly preferred provision is that the electronic safety system assumes its full monitoring activity when it no longer receives the signal that indicates the initialization phase, and that it enables the final stages of the actuators of the automated gearbox when it recognizes no processor errors from the main processor. A particularly preferred provision is that after the final stages have been enabled the normal driving operation may be assumed by the function software.

A particularly preferred provision is that the final stages are shut off again and the control unit is reset if a processor error is detected at the function level or in the function software or the main processor by the electronic safety system. Also preferred is that the final stages of the actuator are shut off if the electronic control unit is shut off, which may also be in particular at the end of an operating phase.

In a preferred design, the signal that indicates the initialization phase of the electronic control unit has two or more redundant partial signals or two or more redundant variables.

Such variables may in particular be designed in such a way that each of them has a unique bit pattern.

A particularly preferred provision is that the electronic safety system only accepts the initialization mode when each of these variables indicates a value specified therefor.

Preferably two such variables are provided, which are set to the value-complement pair.

Also preferred is that the final stages are switched on when the electronic safety system no longer receives a signal that indicates that the electronic control unit is in the initialization phase.

Also preferred is that the electronic safety system accepts the initialization phase of the electronic unit, if this initialization phase is indicated by a signal that has two partial signals, and at least one of these two partial signals indicates a predefined value.

An error response of the electronic safety system when a predefined error is detected, in particular from the main processor, may be that the final stages are switched off, or in some other manner. For example, it may also be provided that the particular error case switching state of the final stage is preserved.

The present invention provides a method for controlling an automated gearbox of a motor vehicle, comprising:

providing an electronic control unit having a main processor;

controlling a predefined functionality of the automated gearbox using a function software running on the main processor under predefined conditions;

detecting a safety-critical operating state of the motor vehicle in advance using an electronic safety system having a redundant processor and a monitoring software;

adapting at least one touch point of a clutch unit in normal operation according to at least one predefined characteristic; and monitoring a result of the adapting of the touch point using the electronic safety system.

According to the present invention, a clutch unit is provided, and for at least one touch point of this clutch unit to be adapted in normal operation according to at least one predefined characteristic.

Furthermore, it is provided in particular that the electronic safety system monitors results of the touch point adaptation.

The clutch unit is preferably a friction clutch unit. It is particularly preferred that the clutch unit is a computerized clutch unit. An example of such a computerized clutch unit is offered by the applicant under the name "Electronic Clutch Management (ECM)."

A touch point is in particular a position of the clutch unit in which the clutch unit is able to transfer a predefined low torque, for example 0.5 Nm or 5 Nm. It should be pointed out that the concept of the touch point is not meant to be limited to the indicated transferable torque, but rather that other predefined torque values are also involved.

According to the present invention, it is provided in particular that from time to time, in particular at predefined time intervals or depending on predefined operating situations, the touch point is adapted.

The particular background is that the assignment of the predefined torque to a predefined clutch position, which is registered in particular using a position sensing device or in some other manner, may change. Such changes may be produced for example by clutch wear or by temperature effects or, if a hydraulic actuating device is included, by air bubbles in the hydraulic column or in some other way, without the present invention being limited thereby.

In a preferred design the electronic safety system does not monitor the actual process of the touch point adaptation, but only its result. This is not intended to limit the present invention, however, so that in principle the execution of the adaptation routines may also be monitored in addition or alternatively. The adaptation routines are preferably intended for the touch point and the position of the clutch unit and detected distance to be coordinated in such a way that based on the detected distance or the corresponding indicated position values of the clutch unit it is possible to determine when or whether the predefined torque is transmissible by the clutch unit, namely as the maximum torque transmissible by the clutch unit in this position.

In a preferred design, the electronic safety system monitors whether the position of the touch point has changed compared to a previous check and/or since the previous touch point adaptation.

A particularly preferred provision is that the electronic safety system monitors whether the change in the position of the touch point compared to the last check and/or compared to the result of the last touch point adaptation lies within a predefined tolerance field or has changed by less than a predefined value compared to the last touch point. This value may be a difference of values having a positive and/or negative sign.

Preferably it is provided that a distinction is made between different touch points or touch point adaptations. It is particularly preferred that a distinction is made between a long-term touch point or long-term touch point adaptation and a short-term touch point or short-term touch point adaptation, the short-term touch point adaptation or short-term touch point referring to dynamically rapidly changing touch points and the long-term touch point or long-term touch point adaptation referring to the dynamically comparatively slowly changing touch points.

For example, without the present invention being limited thereby, a dynamically long-term shift in touch point may be caused by clutch wear. Also mentioned as an example, without intending to limit the present invention thereby, a short-term touch point adaptation or short-term touch point may refer to a short-term touch point change, for example touch point changes that are caused by temperature effects.

Preferably, the results of the long-term touch point adaptation as well as the results of the short-term touch point adaptation are monitored by the electronic safety system.

In a preferred design, the electronic control unit implements a control strategy which causes the short-term touch point to be set to the long-term touch point under predefined conditions, or to be reset to the long-term touch point from time to time. Purely as an example, without intending to limit the present invention thereby, there may be a provision that in the case of a clutch actuating device having a hydraulic section this hydraulic section is purged from time to time, and/or at least a segment of this hydraulic section is set to a defined setpoint size from time to time. This may be effected for example by the hydraulic section having an opening at a predefined location and this opening forming a connecting or snifter bore between the hydraulic section and a storage tank filled with hydraulic medium. An element applying pressure to the hydraulic section, such as pistons or the like, may be moved from time to time in such a way that the hydraulic section is connected with the hydraulic storage tank via the snifter bore. The element such as pistons applying pressure to the hydraulic section may then be moved again over the snifter bore, so that after the element has completely moved over the snifter bore the hydraulic section has a predefined, reproducible length. This "sniffing" is able to change the touch point, in particular the short-term touch point. As a result, it is possible, for example, after such "sniffing," for the short-term touch point to be reset to the long-term touch point.

In a preferred design, the short-term touch point and the long-term touch point are each monitored individually by the electronic safety system.

A particularly preferred provision is that in conjunction with the monitoring of the results of the touch point adaptation performed by the electronic safety system, a check is performed of whether the elapsed time period since the previous touch point adaptation and/or since the previous check is greater than a predefined limiting period.

Also preferred is the fact that the electronic safety system indicates an error if the touch point was changed in conjunction with the touch point adaptation by an amount that is greater than a predefined limiting value and/or if a time period has elapsed since the last touch point adaptation and monitoring that is shorter than a predefined limiting time period.

A particularly preferred provision is that this limiting value and/or this limiting time period are set to different values for the long-term touch point and for the short-term touch point.

The present invention provides a method for controlling an automated gearbox of a motor vehicle, comprising:

providing an electronic control unit having a main processor;

controlling a predefined functionality of the automated gearbox using a function software running on the main processor under predefined conditions;

detecting a safety-critical operating state of the motor vehicle in advance using an electronic safety system having a redundant processor, a monitoring software and a plurality of function blocks.

According to the present invention, in particular a method for controlling an automated gearbox of a motor vehicle is provided, in which an electronic safety system having a plurality of function blocks is provided or used.

In a preferred design, these function blocks are modularly separated from each other.

Preferably, a first function block of the electronic safety system is provided, in which a check is performed of whether predefined input signals describe the operating state of the motor vehicle and/or of the clutch unit of the motor vehicle and/or of the transmission unit of the motor vehicle in a plausible manner. This function block is also referred to as the "signal plausibility check" function block.

Possible input signals for example are those that characterize the operating state of the motor vehicle and/or of the automated gearbox, such as the engine speed and the vehicle velocity.

Preferably input signals are also provided which are determined in the actual transmission control or in the functional level or by the function software, and which influence the operation of the motor vehicle and/or of the transmission.

Preferably a second function block of the electronic safety system is provided in which a decision is made, depending on plausible signals, as to which operating states will be monitored for safety-critical situations.

This function block is also referred to as the "situation recognition" function block.

The plausible signals are in particular those signals that are output signals of the first function block. For example, without intending to limit the present invention thereby, a determination of this sort may be such that when the vehicle is stopped, or triggered by signals that indicate that the vehicle is stopped, unwanted start is prevented, or that when the vehicle is moving or in the presence of signals that indicate that the vehicle is moving, shifting into an excessively low gear is prevented according to a predefined characteristic. However, a great number of additional or other options are possible and preferred when determining the safety-critical events to be monitored.

In a preferred design, a third function block of the electronic safety system is provided, in which a check is performed of whether impermissible control strategies are being introduced at the functional level of the electronic control unit.

This function block is also referred to as the "action monitoring" function block.

The function level of the electronic control unit is in particular an area that includes the function software.

A preferred provision is that as input signals to the third, "action monitoring" function block the input signals are provided that characterize the operating state of the motor vehicle or of the automated gearbox and are checked for plausibility (plausible or plausibility-checked vehicle signals), as well as the input signals that are determined in the actual transmission controller, and in particular are intended for operating the transmission. These last-named signals are also referred to as function-level signals.

In addition to the plausible vehicle signals and the function-level signals, preferably the output signals of the second function block are provided as input signals to the third function block.

A particularly preferred provision is that an analysis is performed in the third, "action monitoring" function block to determine whether the function level signals are in harmony with the plausible vehicle signals. For example, without intending to limit the present invention thereby, it is possible among other things to determine from the current vehicle speed the lowest permissible gear, with which the gear requested or selected by the function level is then compared. A preferred design provides that, in the event that an error is detected in the third, "action monitoring" function block that error is displayed.

In particular, provision is made that a corresponding error signal is sent to the fifth signal block, which will be explained below. A particularly preferred design provides that signals which indicate action variables of the function monitoring that have been checked for plausibility are sent from the "action monitoring" function block to the fourth function block, which is also referred to as the "actuator monitoring" function block.

It is particularly preferred that a fourth action block is provided, which is also referred to as the "actuator monitoring" function block.

Preferably, a check is performed in the "actuator monitoring" function block to determine whether plausibility-checked action variables are being implemented correctly by the transmission and/or clutch actuators. If an error is detected here, it is particularly preferred that an error signal is activated or an error is displayed. This error is preferably reported to a fifth function block.

Preferably output signals of a third function block and/or the system input signals, which are function-level signals, and/or plausibility-checked vehicle signals, which may be in particular output signals of the first function block, are present as input signals at the "actuator monitoring" function block.

In a preferred design, a fifth function block is also provided.

This function block is also referred to as the "error handling" function block. A preferred design provides that a decision is made in the "error handling" function block as to whether an error response should be triggered. Such an error response may be for example to shut off the power electronics which are used to control the transmission or clutch actuators. Furthermore, in addition or alternatively, a reset, i.e. in particular a restart of the electronic control unit may be requested or triggered by the "error handling" function block.

The present invention provides a method for controlling an automated gearbox of a motor vehicle, comprising:

providing an electronic control unit having a main processor;

controlling a predefined functionality of the automated gearbox using a function software running on the main processor under predefined conditions;

detecting a safety-critical operating state of the motor vehicle in advance using an electronic safety system having a redundant processor and a monitoring software;

determining a reference position of the transmission under predefined conditions in conjunction with at least one neutral reference run;

monitoring the at least one neutral reference run using the electronic safety system; and detecting a change in position in relation to the reference position using an incremental distance measuring device.

According to the present invention, it is provided in particular for an incremental distance measurement to be performed using an incremental distance measuring device. This incremental distance measurement makes it possible to register transmission positions as relative positions in reference to a relative location. The reference position is ascertained under predefined conditions in conjunction with a neutral reference run. This neutral reference run is a predefined operation whereby the assignment of transmission positions to positions or distances that are indicated by incremental distance measuring devices may be verified, created or restored.

In particular, provision is made for the neutral reference run to be performed for example after a loss of the forenamed assignment, which may occur for example as a result of a control unit reset. Preferably unwanted interactions with the clutch control are thus avoided.

In particular, according to the present invention such neutral reference runs are monitored by the electronic safety system.

A preferred provision is that the electronic safety system distinguishes between different neutral reference run states, depending on certain neutral reference run conditions.

In particular, it is possible to distinguish the following five examples of neutral reference run states: "neutral reference run inactive," "neutral reference run expected," "neutral reference run cyclically active," "neutral reference run necessarily active" and "transmission positions matched."

The state "neutral reference run inactive" is in particular a state that exists in normal driving operation, and in which no specific monitoring takes place for neutral reference operation. In this state, the electronic safety system monitors only normal operation.

The state "neutral reference run cyclically active" is in particular a state in which the electronic safety system expects that the clutch will be held completely disengaged. It is particularly preferred that, neutral reference runs are conducted cyclically in this state. In particular, it is provided that neutral reference runs that are conducted in this state for confirmation may be interrupted at any time.

The state "neutral reference run necessarily active" checks the electronic safety system to determine whether the clutch is being held completely disengaged. In this state, the electronic safety system conducts a plausibility assessment in regard to the outcome of the neutral reference run.

In the state "neutral reference run expected" there must be no gear changes; this is monitored by the electronic safety system.

In the state "match transmission positions," the electronic safety system, like the normal transmission controller, assigns the incremental measurement values or indicated settings to certain transmission positions.

In particular, it is provided for the electronic safety system to trigger an error message if it ascertains in these states that the particular conditions are not met.

In a preferred design, the electronic safety system monitors predefined operating states depending on neutral reference run states.

A preferred provision is that the first neutral reference run state "neutral reference run inactive" exists if the control unit was first initialized and the control unit was not shut off in the last operating phase by a reset. The first neutral reference run state may also exist if the transmission positions were matched. The first neutral reference run state further exists preferably if a neutral reference run was ended without matching and the neutral reference run state "neutral reference run cyclically active" existed beforehand.

The second neutral reference run state "neutral reference run expected" exists in particular if initialization of the electronic control unit took place beforehand and the electronic control unit was shut off in the last operating phase by a reset.

The state "neutral reference run expected" may also exist or does exist if, in particular after the state "neutral reference run inactive," it was ascertained on the basis of a predefined characteristic that the detected transmission positions are implausible transmission positions.

The neutral reference run state "neutral reference run cyclically active" exists in particular if the first neutral reference run state existed beforehand and the function level or function software has caused a neutral reference run to be begun—in particular when it is begun where there is a large degree of confidence in regard to the correctness of the current reference position. For assessing the magnitude of the degree of confidence, a corresponding predefined characteristic may be provided and/or stored.

The neutral reference run state "neutral reference run necessarily active" exists in particular if the first neutral reference run state "neutral reference run inactive" existed beforehand and the function level or function software has caused a neutral reference run to be begun—in particular where there is a low degree of confidence in regard to the correctness of the current reference position.

The neutral reference run state "neutral reference run necessarily active" also exists in particular if the neutral reference run state "neutral reference run expected" existed beforehand and the function level or function software causes a neutral reference run to be started.

The fifth neutral reference run state "match transmission positions" exists in particular if the neutral reference run state "neutral reference run necessarily active" existed beforehand and the function level or function software causes the neutral reference run to be ended where there is a sufficient degree of confidence and after an adequate movement of the transmission selector lever. The specification of an adequate movement of the selector lever may be prescribed according to a predefined characteristic.

The fifth neutral reference run state "match transmission positions" also exists in particular if the neutral reference run state "neutral reference run cyclically active" existed beforehand and the function level or function software ended the neutral reference run with a matching, i.e. in particular with a matching of the positions.

The present invention provides a method for controlling an automated gearbox of a motor vehicle, comprising:

providing an electronic control unit having a main processor;

controlling a predefined functionality of the automated gearbox using a function software running on the main processor under predefined conditions;

detecting a safety-critical operating state of the motor vehicle in advance using an electronic safety system having a redundant processor and a monitoring software;

determining the gear selected in the transmission unit under predefined conditions and indicating the gear selected in a display; and determining the gear selected in the transmission unit using the electronic safety system and comparing it with the gear indicated in the display.

According to the present invention, in particular the gear selected in the transmission unit is ascertained, at least in normal operation, and is indicated in a display. The electronic safety system also ascertains the gear selected in the transmission unit, in particular redundantly. The electronic safety system then compares the gear ascertained by this electronic safety system with the gear indicated in the display.

Preferably, the electronic safety system detects a lack of agreement between the gear ascertained by the electronic safety system and the gear indicated in the display if the identities of these gears differ.

Preferably the electronic safety systems checks whether the reverse gear is indicated in the display when a forward gear is selected in the transmission unit, or vice versa.

It is particularly preferred that the electronic safety system detects a lack of agreement between the gear ascertained by the electronic safety system and the gear indicated in the display, if the electronic safety system determines that a forward gear is selected in the transmission unit and reverse gear is indicated in the display, or vice versa.

In a preferred design, the electronic safety system indicates an error if a forward gear is indicated in the display when reverse gear is selected in the transmission unit or vice versa, and the clutch unit is to be further or increasingly engaged and/or is further engaged.

Preferably, the electronic safety system indicates an error if a forward gear is indicated in the display when reverse gear is selected in the transmission unit or is ascertained by the electronic safety system, or vice versa, and this lack of agreement exists for a time period that is longer than a predefined limiting time period. This limiting time period may be adjustable, if appropriate.

The present invention provides a method for controlling an automated gearbox of a motor vehicle, comprising:

providing an electronic control unit having a main processor;

controlling a predefined functionality of the automated gearbox using a function software running on the main processor under predefined conditions;

detecting a safety-critical operating state of the motor vehicle in advance using an electronic safety system having a redundant processor and a monitoring software;

determining the gear selected in the transmission unit in an at least interference-free normal operation and indicating the gear selected in as a gear indication in a display;

in conjunction with an initialization of the electronic control unit, performing a check to determine whether the electronic control unit was shut off in a previous operating phase normally, or by a reset of the control unit;

if the electronic control unit was shut off normally in the previous operating phase, monitoring the gear indication in a passive mode according to a predefined characteristic, the passive mode being a standard monitoring mode of the electronic safety systems for the gear indication; and if the electronic control unit was not shut off in the previous operating phase by a reset of the control unit in the previous operating phase, influencing the gear indication according to a predefined characteristic in an active mode that differs from the passive mode using the electronic safety system.

According to the present invention, in particular the gear selected in the transmission unit is ascertained, at least in interference-free normal operation, and is indicated in a display, using a gear detection device that is preferably not associated with the electronic safety system. During or in conjunction with the initialization of the electronic control unit a check is performed to determine whether the electronic control unit was shut off in the previous operating phase by a reset of the control unit, or normally, i.e. not by a reset of the control unit. In particular, this is checked by the electronic safety system.

If it is found during this check that the electronic control unit was shut off normally in the previous operating phase, the electronic safety system monitors the gear display in a passive mode according to a predefined characteristic. This passive mode of gear monitoring is preferably the standard monitoring mode of the electronic safety system for the gear display If it is found during this check that the electronic control unit was shut off in the previous operating phase by a reset of the control unit, the electronic safety system influences the gear display according to a predefined characteristic in active mode or in gear indication active mode. This gear indication active mode differs from the passive mode and from the gear indication passive mode.

In a preferred design, the electronic safety system changes the gear indication or the data shown in the display in active mode.

In a preferred design, the electronic safety system monitors the correct execution of the gear indication changed by the electronic safety system in active mode, in particular supplementally.

A particularly preferred provision is that the electronic safety system is switched back from active mode to passive mode when the transmission settings or the information about the currently selected gear have been verified by a neutral reference run.

A preferred provision is that an additional change from passive mode to active mode is provided in the event that uncertainty about the transmission position is detected again during driving operation on the basis of predefined criteria. But it is also preferred that no other change is provided.

A preferred design provides that an error identification is indicated in the display (the gear display) in active mode. It is also preferred that it be indicated in the display that the electronic safety system is in active mode.

Also preferred is that nothing be shown in the display in active mode.

The present invention provides a method for controlling an automated gearbox of a motor vehicle, comprising:
providing an electronic control unit having a main processor;
controlling a predefined functionality of the automated gearbox using a function software running on the main processor under predefined conditions;
detecting a safety-critical operating state of the motor vehicle in advance using an electronic safety system having a redundant processor and a monitoring software; and
monitoring whether the motor vehicle is starting to move without an existence of a corresponding driver intent using the electronic safety system.

According to the present invention, it is provided in particular for the electronic safety system to monitor whether the motor vehicle starts moving without the existence of a driver intent to that effect, or although there is no corresponding start intent of the driver.

Whether or not there is a driver intent for start may be checked on the basis of predefined criteria. Such criteria may depend in particular on control functionalities of the motor vehicle. For example, it is possible to define that a start intent exists if the driver operates the accelerator pedal. A start intent may also be defined as existing in the event that when a gear is selected, the engine is running, and a braking device of the motor vehicle, in particular the operating brake system, is released.

Other designs for ascertaining a start intent are also preferred.

In a preferred design, the start monitoring is a functionality that is not performed constantly, but only in situations in which the engine of the motor vehicle, such as an internal combustion engine, is running while the motor vehicle is stopped or is moving at a speed that is lower than a predefined limiting speed. In a preferred design, start monitoring is started depending on the engine speed and/or depending on the vehicle speed.

For example, it may be provided that the start monitoring is started when the vehicle speed is lower than a predefined limit for the vehicle speed, and the engine speed is higher than a predefined limit for the engine speed.

In a particularly preferred design, the start monitoring has various sub-functionalities. It is particularly preferred that, there may be provision for the sub-functionalities to be performed depending on whether or not a gear is selected in the transmission unit.

A particularly preferred provision is that when there is no start intent the system monitors whether the setpoint clutch torque is smaller than the creep torque or measuring torque.

The creep torque is in particular a torque which causes the vehicle to begin creeping.

Preferably there is provision for an error response to be triggered if the setpoint clutch torque is greater than the creep torque and/or the measuring torque. A particularly preferred provision is that a transition time passes between the triggering of the error and the determination that the setpoint clutch torque exceeds the forenamed torques or one of the forenamed torques. The error response may also be triggered immediately, however.

In a preferred design, the error response is such that the power electronics are shut off and/or the control unit, such as an ASG control unit, is restarted or reset.

Preferably a check is performed, in particular if no error concerning the setpoint clutch torque has been detected, to determine whether the actually existing clutch torque or actual clutch torque exceeds the clutch torque. It is particularly preferred that, a check is performed to ascertain whether the actual clutch torque exceeds the setpoint clutch torque by more than a predefined amount. These exemplary checks may be performed directly or indirectly. For example, in an indirect check the actual clutch torque is directly measurable. With an indirect examination it is possible for example to check whether the setpoint clutch torque brings about a suitable or predefined clutch position.

The actual clutch torque is preferably the torque transferred by the clutch, and particularly preferably the torque transferable by the clutch.

In a preferred design, to check the actual clutch torque it is possible to check whether the setpoint clutch position is correctly regulated in the position regulating circuit of the clutch actuator.

If an error is detected in this or a similar check, preferably an error response is triggered.

Preferably, the start monitoring has neutral gear monitoring.

A preferred provision is that in conjunction with this neutral gear monitoring a check is performed to determine whether a gear should be selected in the transmission unit with the clutch entirely or partially engaged.

For example, this check may be performed on the basis of the setpoint gear positions or on the basis of control signals for transmission actuators, or in some other manner.

Also preferably, in particular if no error has been detected, a check is performed in conjunction with the neutral gear monitoring to determine whether the neutral gear may be confirmed to be in the neutral alley by a slight movement, in particular a tentative movement.

The following section describes some exemplary functionalities and characteristics which may exist individually or in any combination in an electronic safety system.

It should be remarked, however, that the electronic safety system may also be designed differently or have other features.

The electronic safety system may be intended for preventing safety-critical situations such as those caused for example by CPU errors or errors of the main processor.

The electronic safety system preferably has a redundant processor, which may be a duplicate of the main processor or not a full duplicate of the main processor. Preferably, the electronic safety system has a redundant shut-off path.

A preferred design provides that the electronic control unit has a main processor. Preferably, there is function software stored in this main processor that is assigned to a function level. The function software or function level may assume control functionalities, for example that of a computerized clutch unit or an automated gearbox or the like, independently of the electronic safety system.

There is preferably also monitoring software in the main processor as a component of the electronic safety system.

A preferred provision is that this monitoring software is able to communicate with the function software or the function level.

Another preferred provision is that a monitoring processor, which is assigned to the electronic safety system, exists outside the main processor. In a preferred design, this monitoring processor communicates with the monitoring software in the form of a question-and-answer game, in which the monitoring processor directs questions to the monitoring software and the monitoring software transmits back corresponding responses. To this end there may for example be provision for desired responses to be stored in the monitoring processor, which are compared with the responses of the monitoring software. The responses of the monitoring software may be retrieved for example from a storage device.

A preferred design provides that the electronic safety system causes the electronic control unit to be shut off or reset if the electronic safety system detects an error. A preferred provision is that the electronic control unit has actuators having electric motors or is linked thereto, and that the final stages of these actuators are shut off if the electronic safety system detects an error.

In a preferred design, the hardware structure of the electronic safety system is based on a 1½ processor concept.

The following section depicts some exemplary error situations that are detectable with the electronic safety system. It should be pointed out in this connection that the electronic safety system may also be designed in such a way that part of this situation is detectable, or other situations are detectable.

For example, the electronic safety system may be designed so that downshifting the transmission unit into an excessively low gear while driving is prevented. Such a situation may for example be one where at a speed of 150 km/h downshifting from fifth to second gear is prevented.

For example, the electronic safety system may also be designed so that the touch point of a clutch unit or results of touch point adaptations are monitored.

The electronic safety system may also be designed in such a way that in principle and depending on the situation predefined activations of the transmission actuators that could trigger safety-critical situations are prevented.

Also preferred is that the electronic safety system be designed so that a gear indication is monitored. Preferably the electronic safety system is designed so that it recognizes safety-critical situations in advance in such a way that their occurrence is prevented before they actually materialize. For example, operation of actuators or shifting processes of a predefined type may be prohibited to prevent safety-critical situations.

The present invention also provides an electronic safety system for motor vehicles for carrying out one or more of the methods described herein.

The present invention also provides an adapter plug, or connector for connecting a wire harness plug connector with a control unit connector, wherein:

the adapter connector is configured to couple directly with the wire harness plug connector and the control unit connector and to switch predefined electrical signal connections between the control unit and the wire harness;

the adapter connector is configured to enable the electronic control unit to work together with an electronic safety system that has a redundant processor;

the adapter connector is connectable between the wire harness plug connector and the control unit connector in such a way that the adapter plug is coupled with both the wire harness plug connector and the control unit connector via plug connections;

the adapter connector interrupts at least a portion of a plurality of electrical signal connections between the wire harness plug connector and the control unit connector.

The term "control" (steuern) is used in the present invention in particular to mean "regulate" and/or "control" (regeln and/or steuern) as defined in the DIN standard. The same applies to terms derived from the term "control" (steuern).

BRIEF DESCRIPTION OF THE DRAWINGS

Preferred aspects of the present invention will now be explained on the basis of the figures, which are not intended to limit the present invention.

DETAILED DESCRIPTION

Figure 1:
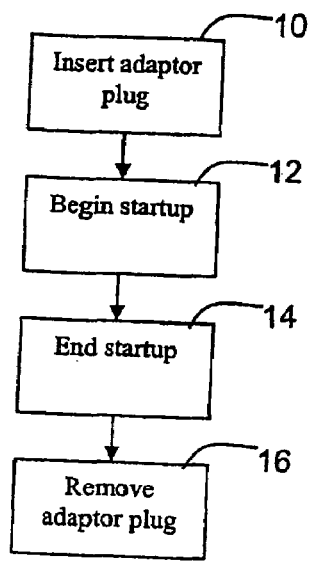
FIG. 1 shows the steps of an exemplary method according to the present invention in schematic representation.

FIG. 1 shows an exemplary embodiment of a method according to the present invention in schematic representation;

In step 10 an adapter plug is inserted between a connector of a wire harness and a connector of a control unit. This causes predefined signals or predefined signal links between these connectors to be interrupted or an exchange of predefined signals to be prevented.

In step 12 a startup is begun, wherein an electronic safety system is at least partially deactivated. This startup may be begun using a predefined startup and diagnostic command. The diagnostic command may be produced via a text device external to the vehicle or via the control unit or in some other way.

In step 14 the startup is ended. Such a startup may be for example the startup of an automated gearbox.

In step 16 the adapter plug is removed again, so that functionalities that were deactivated by the adapter plug are again activated or possible.

Figure 2:
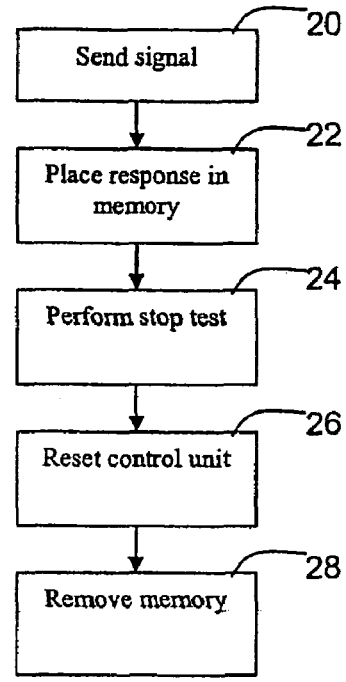
FIG. 2 shows the steps of an exemplary method according to the present invention in schematic representation.

FIG. 2 shows the steps of an exemplary method according to the present invention in schematic representation;

In step 20 a signal is sent from an electronic tester, such as a hand-held tester or the like, to an electronic control unit of an automated gearbox (ASG control unit), which causes the system to switch over from monitoring software that is located in a main processor and belongs to an electronic safety system to substitute monitoring software. This monitoring software, which is used in normal operation of the motor vehicle, or—when switched appropriately—the substitute monitoring software is in communication with a monitoring processor which is a component of the electronic safety system and is located outside the main processor.

In normal operation of the motor vehicle the monitoring processor communicates with the monitoring software in the form of a question-and-answer routine, where the monitoring processor requests predefined characteristic values and the monitoring software transmits corresponding signals that indicate these characteristics to the monitoring processor. In particular, there is provision here for the monitoring software to retrieve these characteristic values from a memory.

The result of step 22 is that correct responses or corresponding characteristics are placed in the memory device of the electronic control unit, so that the questions of the monitoring processor directed to the substitute monitoring software will always be answered correctly.

In step 24 a shop routine or a shop test or a startup of predefined components of the motor vehicle, such as an automated gearbox, is performed.

In step 26 this startup or this shop test is ended and/or the communication link between the electronic tester and the electronic control unit is interrupted.

In step 28 a reset of the control unit is triggered, causing the substitute monitoring software to be deleted or deactivated and the monitoring software to be activated.

In addition, in step 28 the correct responses or characteristic values are removed from the memory of the electronic tester.

Figure 3:
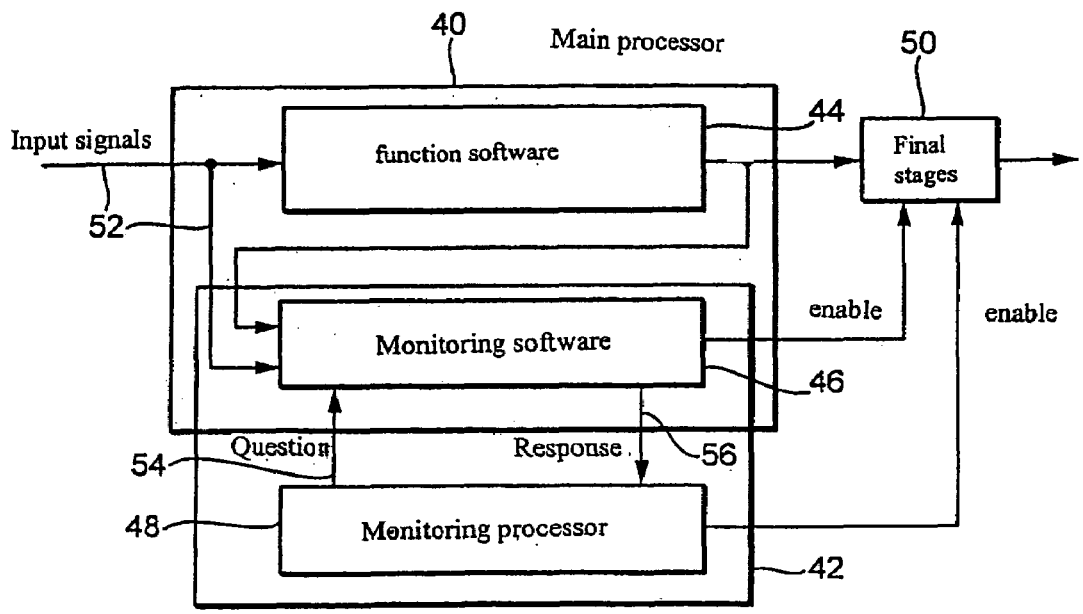
FIG. 3 shows the steps of an exemplary method according to the present invention in schematic representation.

FIG. 3 shows an exemplary structure of a computerized ASG control unit having an electronic safety system in partially sectional schematic representation.

A main processor is indicated schematically by box 40.

An electronic safety system is indicated schematically by box 42.

As indicated schematically by box 44, function software, which controls predefined functionalities, is stored in main processor 40. In a configuration having an automated gearbox or in a configuration as a control unit for an automated gearbox this function software may be for example function software that controls predefined functionalities of the automated gearbox and perhaps additional functionalities, such as for example functionalities of an electronic clutch unit.

Furthermore, stored in main processor 40, as indicated schematically by box 46, is monitoring software that belongs to electronic safety system 42.

Also part of electronic safety system 42 is a monitoring processor, which is an at least partially redundant processor of main processor 40 and is indicated schematically by box 48 in FIG. 3.

The function software may control for example functions of the automated gearbox, such as gear changing or engaging of the clutch unit or the like.

Using the monitoring software, safety-critical actions and control commands of the function software are monitored, i.e. in particular those that may result in safety-critical situations, such as for example—without intending to limit the present invention thereby—downshifting from a fifth into a second gear at high speed, for example 150 km/h.

The electronic control unit also has actuators having electric motors, whereby setting procedures of the clutch unit are produced. These actuators have final stages, which are indicated schematically by box 50.

Arrows 52 are a schematic representation of input signals which are conveyed to function software 44 and/or monitoring software 46.

Monitoring processor 48 and monitoring software 46 monitor each other by using a question-and-answer routine, which is indicated schematically by arrows 54, 56.

If questions directed by monitoring processor 48 to the monitoring software are answered incorrectly, an error in the main processor is assumed and final stages 50 are shut off and/or a reset of the control unit is triggered and/or the error is indicated in some other way.

Such a system, represented in FIG. 3, may be used in particular to perform a procedure according to the present invention.

Figure 4:
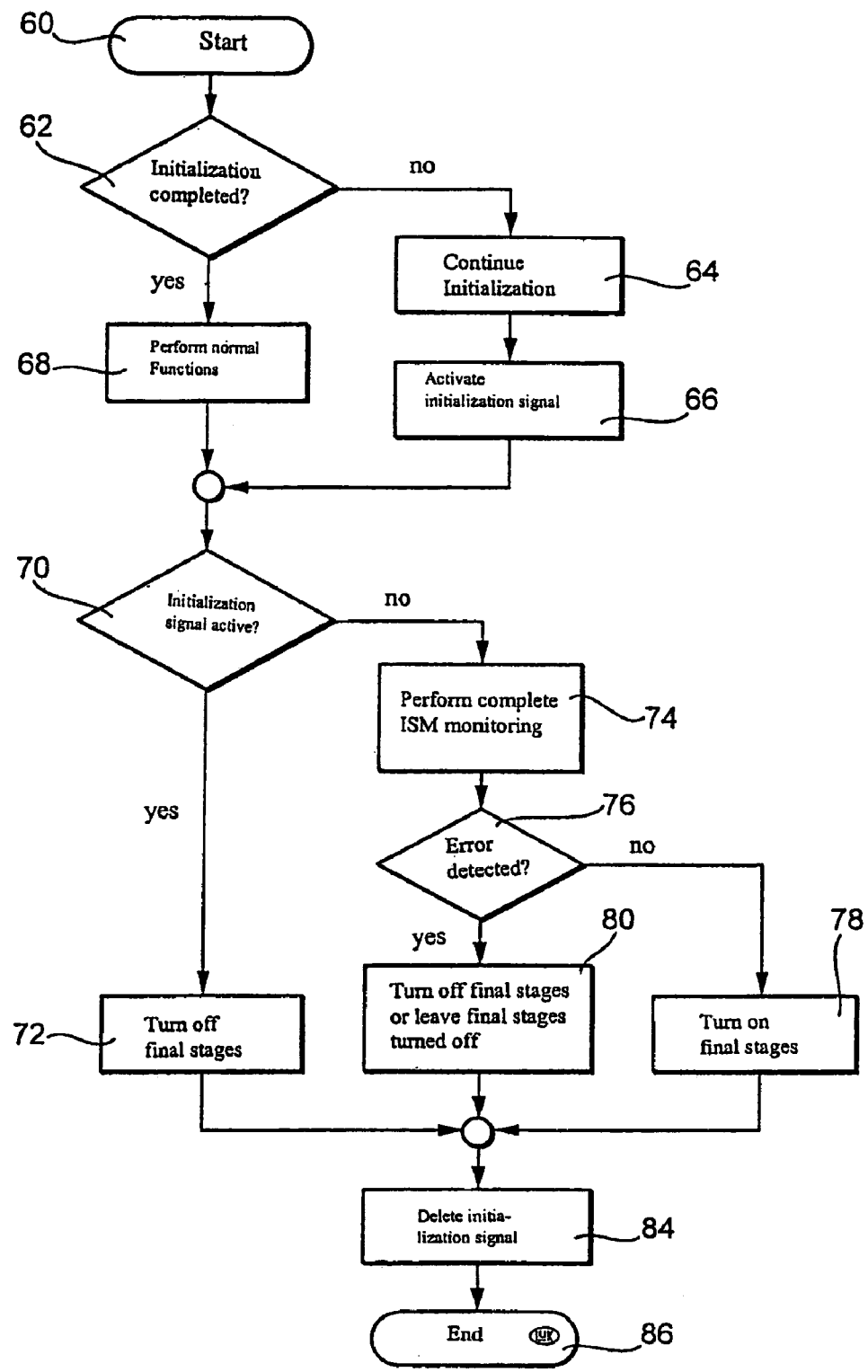
FIG. 4 shows the steps of an exemplary method according to the present invention in schematic representation.

FIG. 4 shows the steps of an exemplary method according to the present invention in schematic representation;

The procedure is started in step 60.

Step 62 checks whether the initialization of the electronic control unit is complete.

If it is found in step 62 that the initialization of the electronic control unit is not complete, in step 64 the initialization of the electronic control unit is continued and in step 66 an initialization signal is activated which indicates that the control unit is in the initialization phase.

However, if it is determined in step 62 that the initialization of the electronic control unit is complete, in step 68 normal functions are performed, i.e. in particular normal control functions.

Step 70 checks whether the initialization signal is active.

If it is determined in step 70 that the initialization signal is active, in step 72 the final stages of the actuators of the electronic control unit are shut off.

However, if it is determined in step 70 that the initialization signal is not active, in step 74 the electronic monitoring system performs complete monitoring or monitoring to the full extent.

Step 76 checks whether the electronic monitoring system or the electronic safety system has detected an error, in particular an error from which it is concluded that there is an impairment of function of the main processor.

If no error was detected in step 76, in step 78 the final stages of the actuators of the electronic control unit are turned on.

However, if an error was detected in step 76, in step 78 the final stages are turned off or are left turned off.

In step 84 the initialization signal is deleted again.

In step 82 the procedure or procedural loop is ended.

Figure 5:
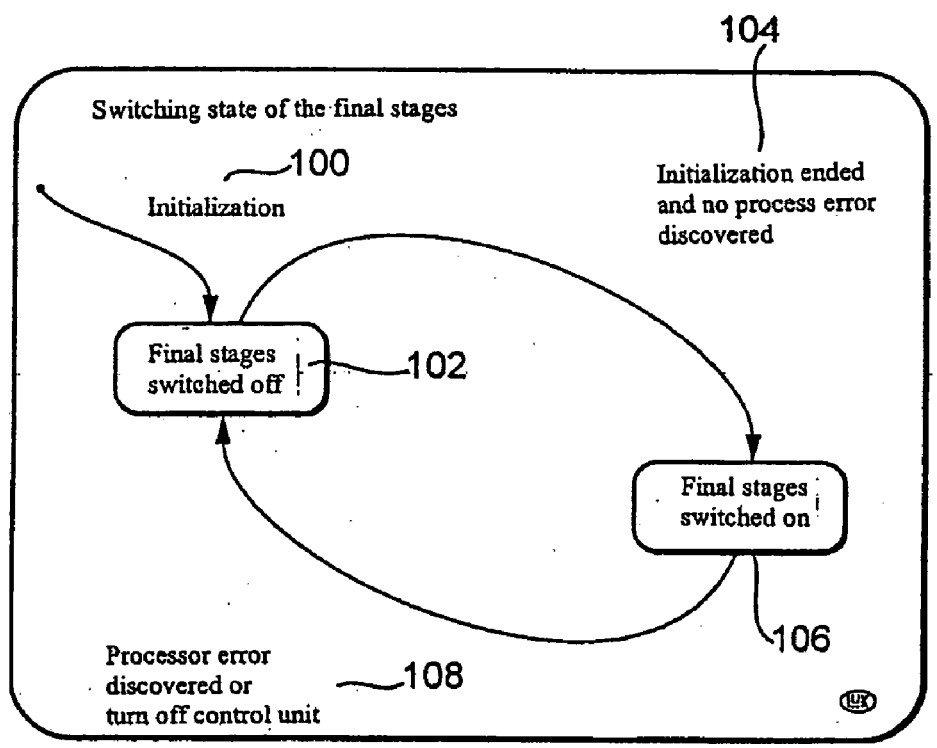
FIG. 5 shows the steps of an exemplary method according to the present invention in schematic representation.

FIG. 5 shows steps of an exemplary method according to the present invention in schematic representation and switching states of the final stages of the actuators of an electronic control unit.

In step 100 initialization of the electronic control unit is started.

In step 102 the end stages of the actuators, in particular the end stages of the actuators of the electronic control unit or of the automated gearbox, are turned off.

In step 104 initialization of the electronic control unit is ended and no error of the main processor is detected.

Subsequently in step 106 the final stages of the actuators are turned on.

If a processor error of the main processor is discovered in step 108 or the electronic control unit is shut off, the final stages are shut off again in step 102.

Figure 6:
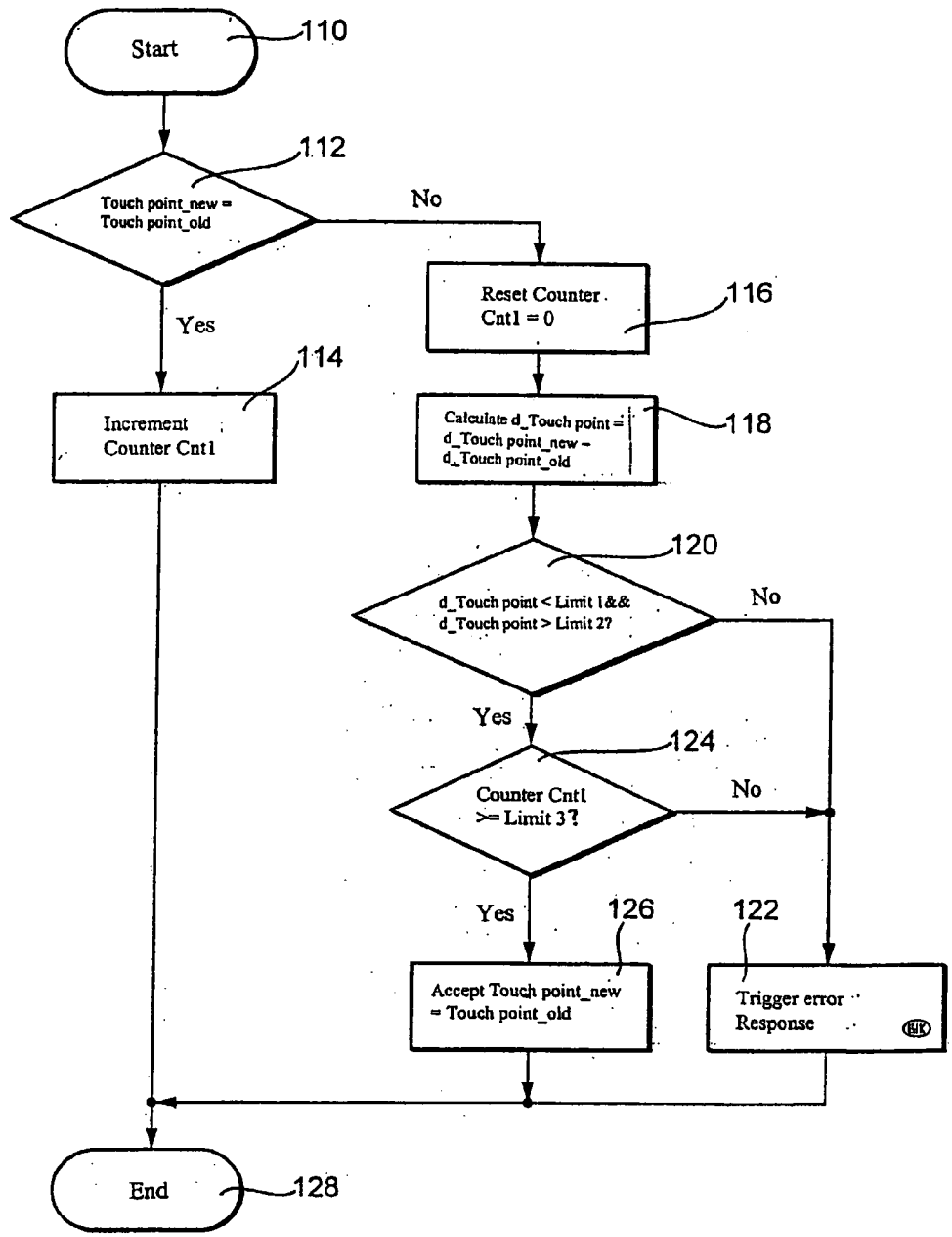
FIG. 6 shows the steps of an exemplary method according to the present invention in schematic representation.

FIG. 6 shows the steps of an exemplary method according to the present invention in schematic representation;

The process sequence shown in FIG. 6 may be used in particular for monitoring the long-term touch point or for adapting the long-term touch point.

The procedure is started in step 110.

Step 112 checks whether the touch point has changed from the last computing cycle or the last touch point adaptation or the last check, or whether the current touch point corresponds to the previous touch point.

If no change is found in the touch point or the touch point corresponds to the previous touch point, in step 114 a time counter is incremented.

However, if a change in the touch point was found in step 12, the system investigates whether this change may be the result of a regular touch point adaptation.

Subsequently in step 116 the counter is set back or set to zero.

In step 118 the touch point change is determined by taking the difference between the new touch point and the old touch point, i.e. in particular the respective position values.

Step 120 checks whether the touch point change detected in step 118 lies within a predefined interval or tolerance band. To this end, a check is performed of whether the touch point change is smaller than a first limit and greater than a second limit. The second limit in particular may also assume a negative value.

If it was determined in step 120 that the touch point change does not lie within this tolerance band, in step 122 an error response is triggered.

But if it was determined in step 120 that the touch point change does lie within the tolerance band, in step 124 a check is performed to determine whether the time incremented by the time counter is greater than a predefined limit. This is intended in particular to check whether the time elapsed since the last change of the touch point exceeds a predefined minimum duration.

If it is determined in step 124 that the elapsed time period is less than the time limit, in step 122 an error response is triggered.

The triggering of the error response in step 122 indicates in particular that the conclusion is being drawn that the touch point change does not come from a regular adaptation, but is caused by an error in the electronic control unit.

However, if it is determined in step 124 that the elapsed time period is greater than the predefined limit, in step 126 the touch point is adopted as the new touch point.

The procedure is ended in step 128.

Figure 7:
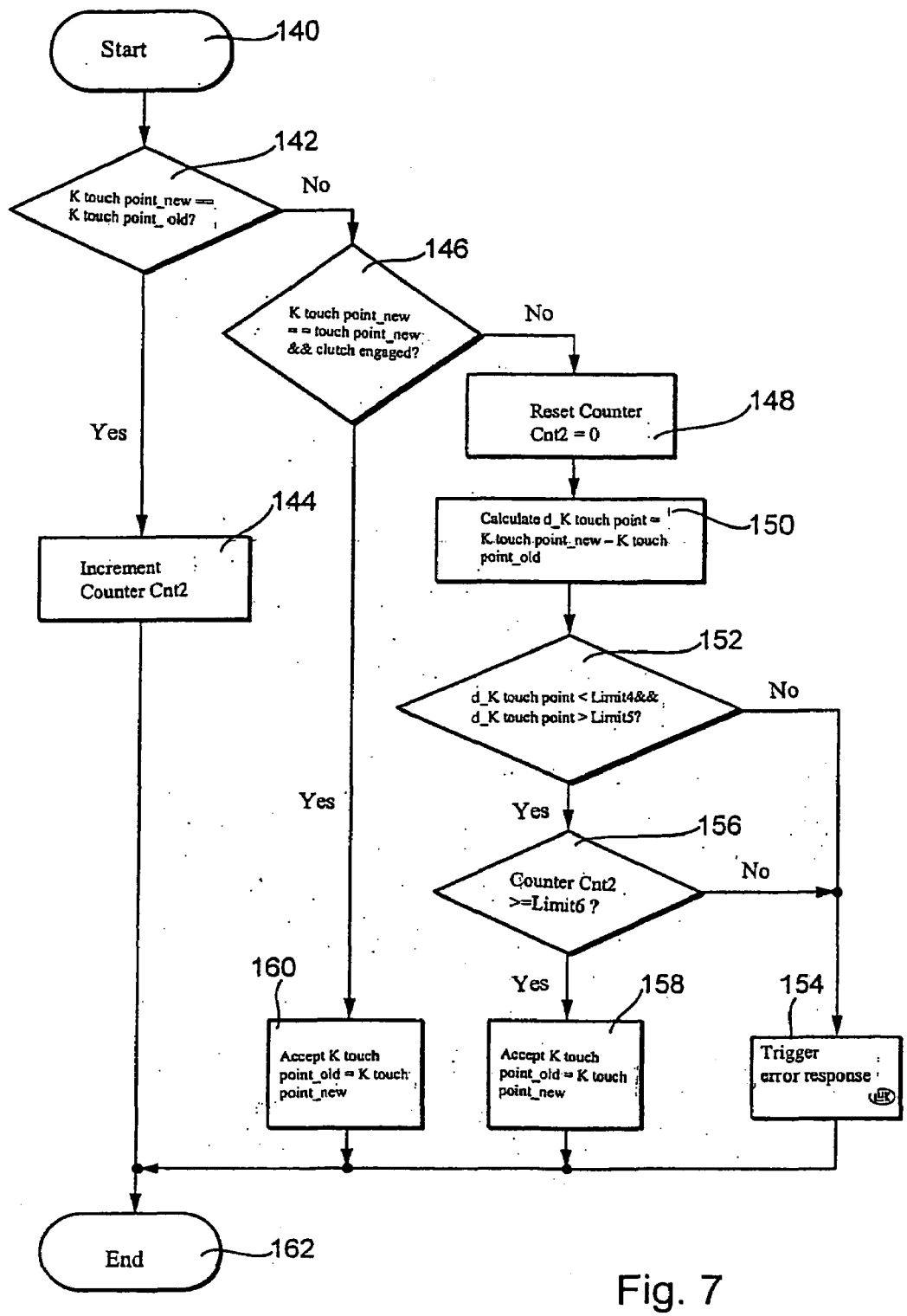
FIG. 7 shows the steps of an exemplary method according to the present invention in schematic representation.

FIG. 7 shows the steps of an exemplary embodiment of a method according to the present invention.

The method represented in FIG. 7 may be used in particular for monitoring or adapting the short-term touch point.

In particular it is possible to combine the method according to FIG. 7 with the method according to FIG. 6, or to perform it at the same time or according to a predefined characteristic which may depend on the sequence of the operation.

The procedure is started in step 140.

Step 142 checks whether the short-term new touch point corresponds to the short-term old touch point.

If this is the case, in step 144 a time counter is incremented, this time counter being different in particular from the time counter according to step 114.

However, if it was found in step 142 that the short-term new touch point differs from the short-term old touch point, step 146 checks whether the short-term new touch point corresponds to the long-term new touch point, as well as whether the clutch is engaged.

If one of these conditions according to step 146 is not fulfilled, in step 148 a time counter is set back to zero.

Then in step 150 the change in the short-term touch point is determined. To this end, the difference between the short-term new touch point and the short-term old touch point is calculated.

Step 152 then checks whether the change in the short-term touch point detected in step 150 lies within a predefined interval. To this end, a check is performed in particular to determine whether the change in the short-term touch point is smaller than a predefined fourth limit and greater than a predefined fifth limit.

If it was determined in step 152 that the change in the short-term touch point does not lie within the interval, in step 154 an error response is triggered.

However, if it was determined in step 152 that the change in the short-term touch point does lie within the predefined interval, in step 156 a check is performed to determine whether a predefined time period has elapsed. This step corresponds essentially to step 124, except that the time limit or period may be set or is set to a different setting.

If step 156 shows that the elapsed time period is less than the predefined time limit, in step 154 an error response is triggered.

However, if it was determined in step 156 that the elapsed time period is greater than or equal to the predefined time limit, in step 158 the short-term touch point is adopted as the new short-term touch point.

However, if it was determined in step 146 that the short-term new touch point does not correspond to the long-term new touch point, or if it is determined that the clutch is not engaged, in step 160 the short-term touch point is adopted as the new short-term touch point.

The procedure is ended in step 162.

Figure 8:
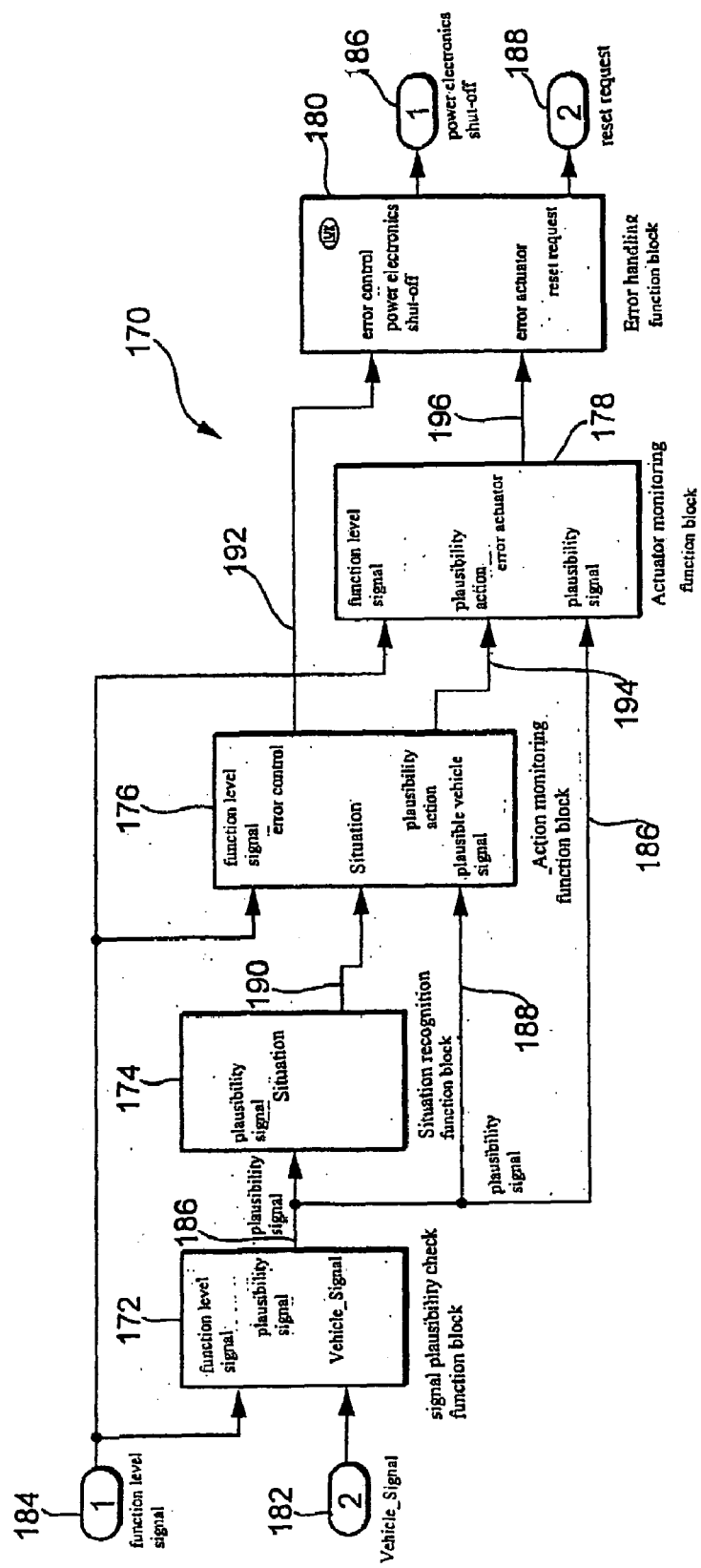
FIG. 8 shows an exemplary structure of an electronic safety system in schematic partial view.

FIG. 8 shows an exemplary structure of an exemplary electronic safety system 170 in partial and schematic representation.

Electronic safety system 170 has a first function block 172, a second function block 174, a third function block 176, a fourth function block 178 and a fifth function block 180.

In the design according to FIG. 8, input signals 182, 184 and output signals 186, 188 are also provided.

Input signals 182 represent measurable variables that characterize the operating state of the motor vehicle and/or the automated gearbox, such as for example—without intending to limit the present invention thereby—the engine speed or the vehicle speed.

Input signals 182 are also referred to as vehicle signals.

Input signals 184 are various signals that are determined in the actual transmission controller or the function level of the electronic control unit, and which influence the operation of the transmission or the vehicle. These signals are used in particular to produce functionalities of the transmission and/or the vehicle.

Input signals 184 are also referred to as function-level signals.

Input signals 184 are provided to the first function block 172, third function block 176 and fourth function block 178.

Input signals 182 or vehicle signals are provided to first function block 172.

The first function block is a "signal plausibility check" function block.

In this function block the electronic safety system checks input signals 182, 184 to determine whether they describe or are able to describe in a plausible way the operating state of the vehicle and/or of the transmission and/or of the clutch.

If so, they are placed at the output of the first function block as corresponding plausible signals 186 or as corresponding plausible function level signals or as corresponding plausible vehicle signals 188.

Plausible signals 186 are provided to the second function block and to the fourth function block. Plausible vehicle signals 188 are also provided to third function block 176.

In the second, "situation recognition" function block, plausibility-checked signals 186 are used to decide which operating states should be monitored for possible safety-critical events. Corresponding signals 190 which indicate this are sent to third function block 176.

In the third, "action monitoring" function block, depending on function-level signals 184, signals 190 and plausible or plausibility-checked vehicle signals 188, a check is performed of whether impermissible control strategies are being introduced in the function level. In so doing, the system analyzes in particular whether function-level signals 184 are in harmony with plausibility-checked vehicle signals 188.

For example, without intending to limit the present invention thereby, it is possible to determine from the current vehicle speed the lowest permissible gear, and to then compare it with the gear requested or selected or to be selected by the function level.

If an erroneous action of the function level is detected in the "action monitoring" function block, the action monitoring activates an error signal 192, which is reported to the fifth function block.

In addition, third function block 176 sends to fourth function block 178 signals 194, which indicate plausibility-checked action variables of the function level.

In the fourth, "actuator monitoring" function block depending on these signals 194 and depending on function-level signals 184 and plausibility-checked signals 186, a check is performed of whether plausibility-checked action variables are being translated in the correct or predefined way by the transmission and/or clutch actuators. If an error is detected here, a corresponding error signal 196 is reported to the fifth function block.

Such a plausibility-checked action variable may be for example a protected target gear, without intending to limit the present invention thereby.

In the fifth, "error handling" function block 180, depending on signals 192, 196, the decision is made as to whether an error response should be triggered, which may result for example, as indicated by output signal 186, in shutting off the power electronics, which are used to control the transmission or clutch actuators, or, as indicated for example by signal 188, in resetting or restarting the electronic control unit.

Figure 9:
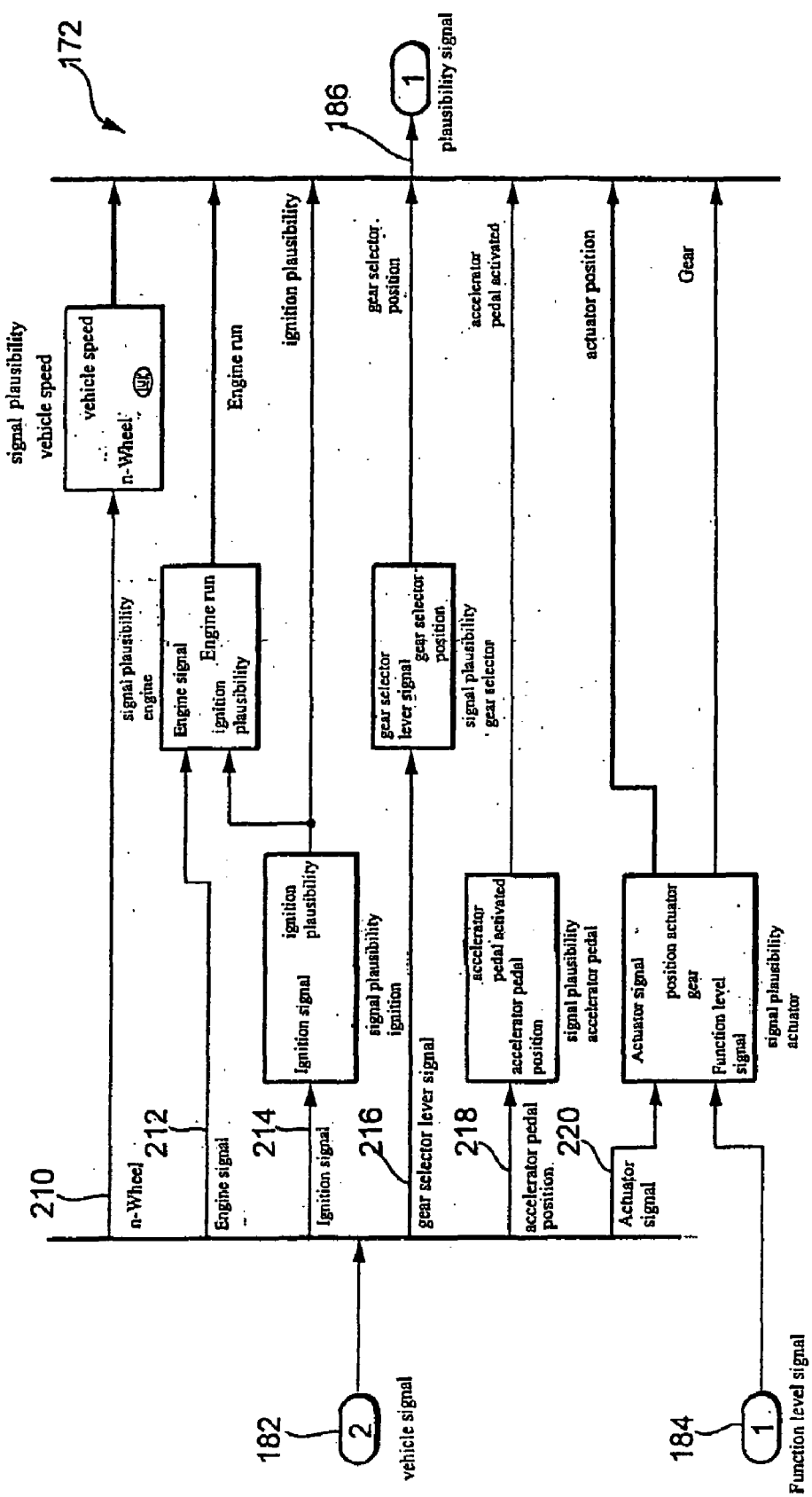
FIG. 9 shows an exemplary structure of a function block of an electronic safety system in schematic partial view.

FIG. 9 shows an exemplary structure of the "signal plausibility check" function block in schematic representation.

In "signal plausibility check" function block 172, in this exemplary design wheel speeds 210, engine speed 212, ignition signal 214, gear selector lever signal 216, accelerator pedal position 218, and positions 220 of the transmission and/or clutch actuators are checked and further processed.

In conjunction with the check, it is provided in particular for the clearest possible conclusions to be reached about the operating state of the vehicle and its drive train, as well as about intent of the driver in regard to controls, vehicle states and the like.

The results of these checks are combined in a signal vector 186, in which the plausibility-checked vehicle signals and plausibility-checked function-level signals are combined.

Figure 10:
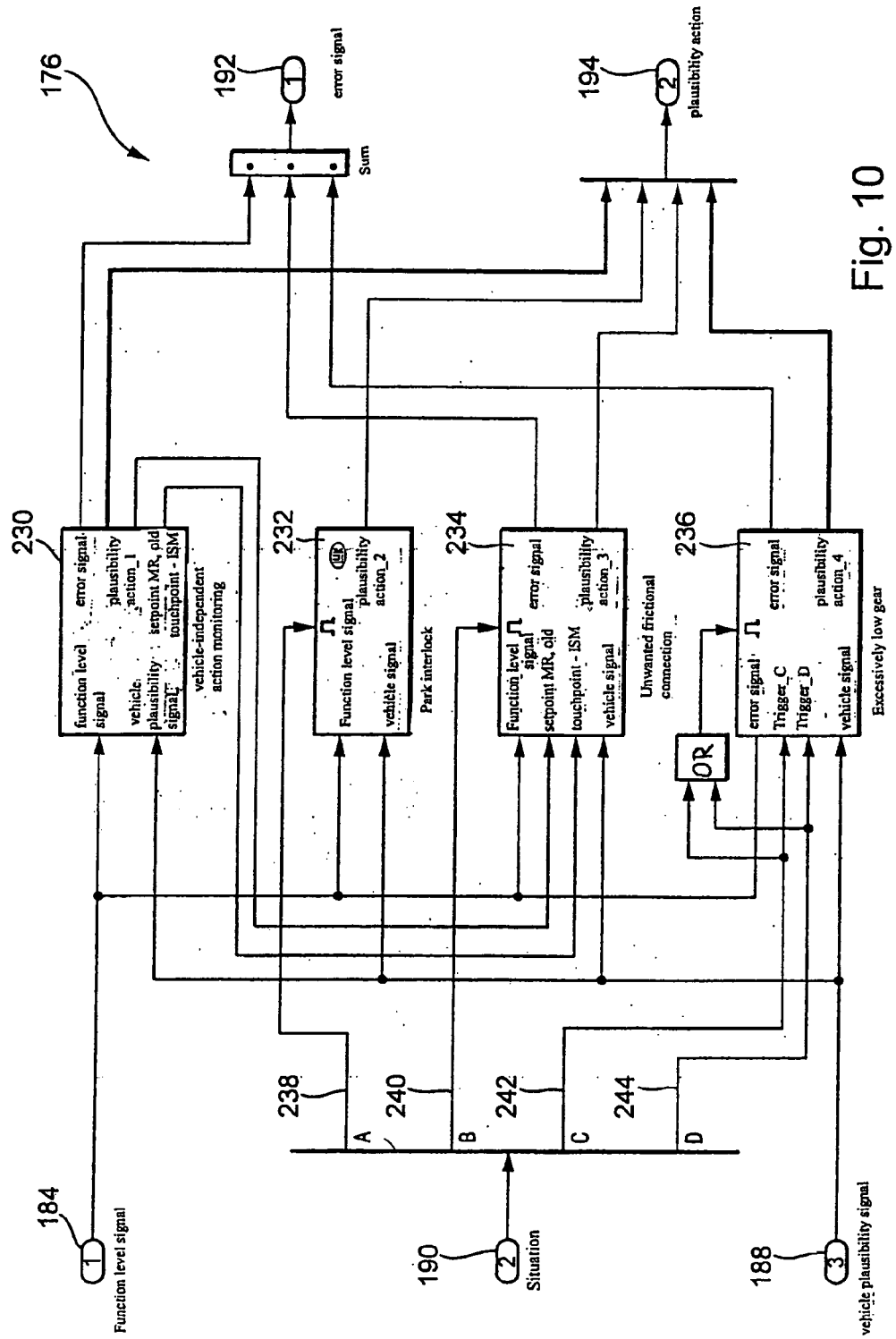
FIG. 10 shows an exemplary structure of a function block of an electronic safety system in schematic partial view.

FIG. 10 shows an exemplary structure of the "signal plausibility check" function block 174 in schematic representation.

According to the representation in FIG. 10, "actuator monitoring" function block 176 is modular in structure and has vehicle-state-independent modules 230 and vehicle-state-dependent modules 232, 234, 236.

Vehicle-state-independent modules 230 are checked constantly, and vehicle-state-dependent modules 232, 234, 236 are checked after a corresponding relevant driving situation has been detected. The corresponding relevance of driving situations is ascertained by a predefined characteristic and/or is stored accordingly.

The constantly monitored vehicle modules or the constantly active monitoring activities may include for example a plausibility check of a clutch engagement point or clutch touch point, on which relevant clutch control activities may possibly depend.

Vehicle-state-dependent module 232, in which a parking interlock is monitored, is monitored or activated if a predefined situation 238 is reported. Situation 238 is in particular one where the vehicle is stopped and the engine is turned off.

Vehicle-status-dependent module 234 is activated or monitored if a predefined situation 240 exists.

In module 234 a check is performed in particular of whether an unwanted positive engagement exists in the drive train of the motor vehicle. Situation 240, which sets off this monitoring, is in particular one where no start intent of the driver exists. A start intent may be indicated for example by operating the accelerator pedal and/or if the engine is running while the vehicle is stopped.

A check or monitoring using vehicle-state-dependent module 236 is performed if one of predefined situations 242, 244 exists.

Module 236 monitors in particular whether an excessively low gear is selected or is to be selected.

Various situations are distinguished here. One situation in particular that triggers this check is that the vehicle is moving. It is possible here, as indicated by the divided depiction of the situation 242, 244, to distinguish between the cases where the engine is stopped (situation 242) and the engine is running (244).

When an illegal action is detected, all modules of the action monitoring provide a contribution to an error signal 192 or are included therein. In addition, these modules 232, 234, 236 may output plausibility-checked function-level signals or characteristics derived therefrom for the downline actuator monitoring (194).

Figure 11:
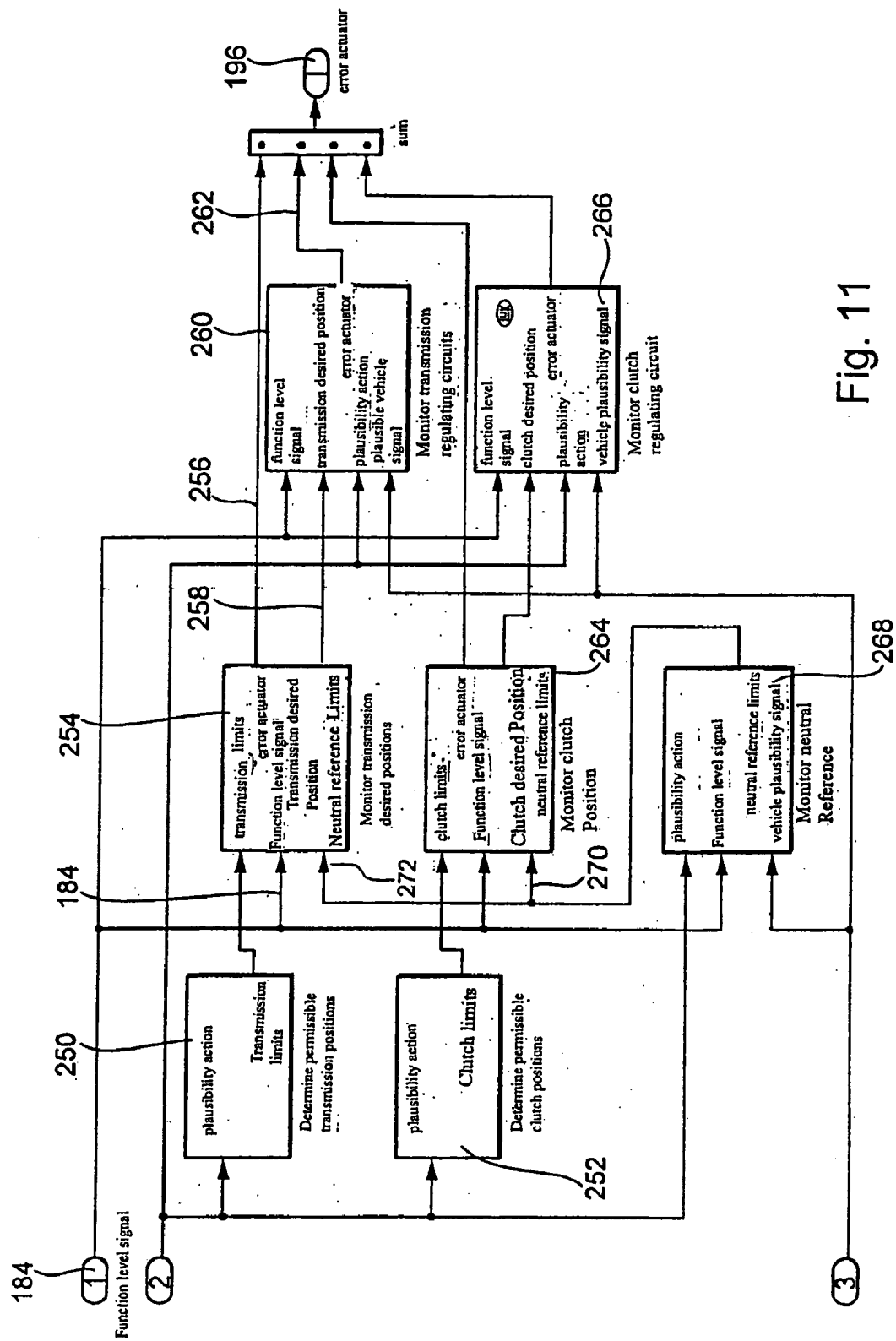
FIG. 11 shows an exemplary structure of a function block of an electronic safety system in schematic partial view.

FIG. 11 shows an exemplary structure of an "actuator monitoring" function block in schematic representation.

This function block is based, preferably in combination with the other modules or function blocks, on the principle that the individual links of a signal chain "situation-strategy-setpoint variables-manipulated variables" are secured or checked individually.

In the "actuator monitoring" function block, plausibility-checked transmission control strategies (such as a plausibility-checked target gear) are used to determine permissible transmission positions or settings, as indicated schematically by reference symbol 250.

In the process, in particular permissible intervals or position limits of the permissible transmission positions are determined.

In a similar manner, as indicated by reference symbol 252, permissible clutch positions or clutch position ranges are determined.

In step 254 or in module 254, the determined permissible transmission positions are compared with the target positions requested by the function level, whereupon, as indicated schematically by reference symbol 256, a partial signal 256 of an error signal 196 is generated if the requested destination positions lie outside of the permissible range.

In addition, transmission setpoint positions are forwarded via a signal 256 to a monitoring module 260, if these transmission setpoint positions lie within the permissible range for the transmission positions.

In sub-module 260 a transmission regulating circuit monitoring occurs, in which the manipulated variables contained in function-level signal 184 are checked with respect to the plausibility-checked vehicle, action, and setpoint values, and in the event of an error an error response is triggered, or a signal contribution 262 to an error signal 196 is generated.

In a similar manner, a sub-module that is made up in turn of additional sub-modules 252, 264, 266, is provided for monitoring the clutch actuators. The monitoring path for monitoring the clutch actuators is connected essentially in parallel to the monitoring path for monitoring the transmission actuators.

Also provided is a module 268 of the "actuator monitoring" function block, which is used to monitor neutral reference runs.

In conjunction with monitoring the neutral reference runs or monitoring the results of neutral reference runs, in module or step 268, depending on the operating states, additional boundaries may possibly be determined for permissible transmission and/or clutch positions, which are taken into account as signals 270 and 272 in the steps in sub-modules 254 and 264, respectively.

Figure 12:
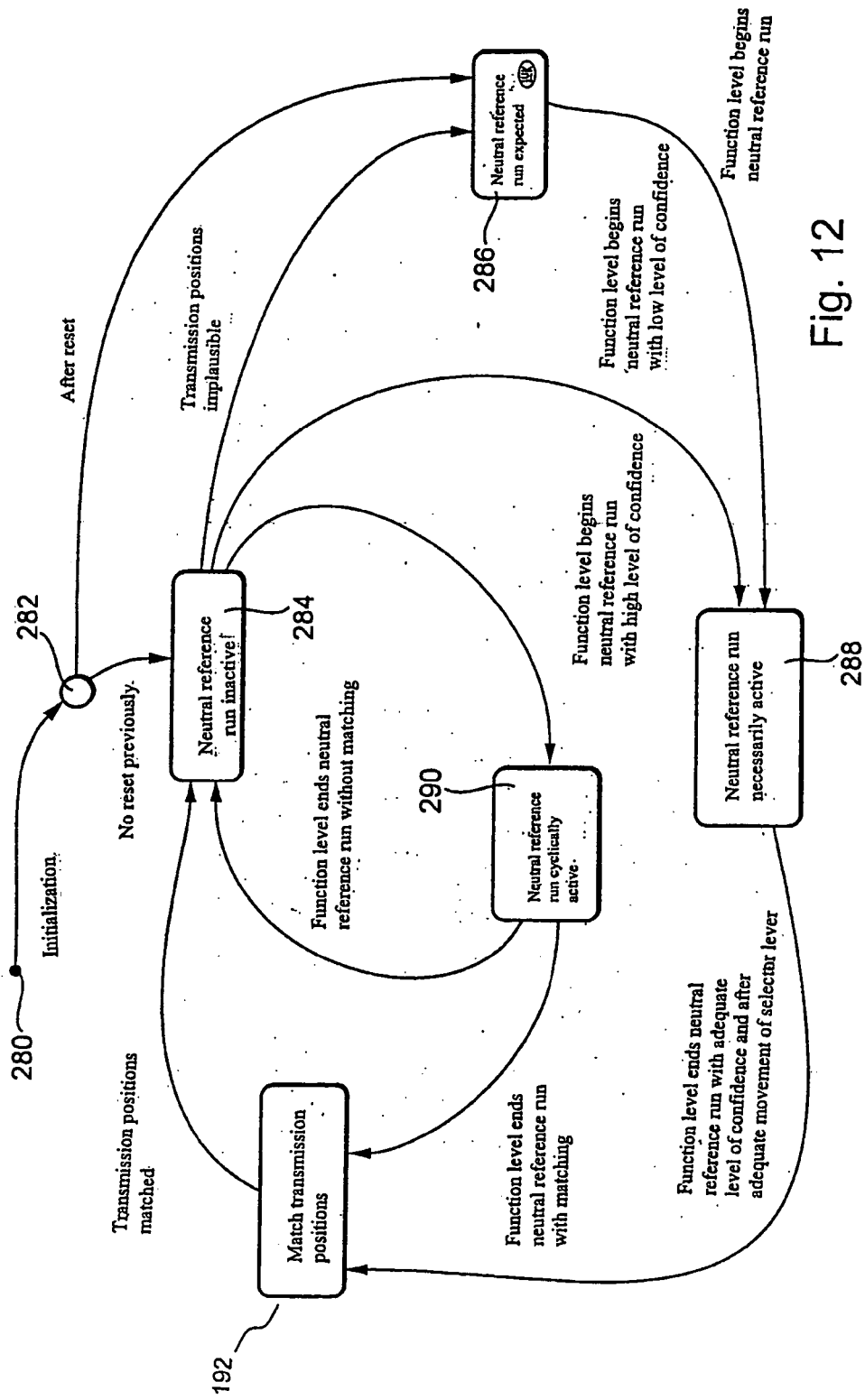
FIG. 12 shows the steps of an exemplary method according to the present invention in schematic representation.

FIG. 12 shows the steps of an exemplary method according to the present invention in schematic representation.

The method according to FIG. 12 may be used in particular to monitor a neutral reference run or the results of a neutral reference run by means of the electronic safety system.

In step 280 the initialization of the electronic control unit is started.

Step 282 checks whether the electronic control unit was shut off in the previous operating phase after or through a reset, or normally or without a reset of the electronic control unit.

If it is determined in step 282, in particular during the initialization of the electronic control unit, that the electronic control unit was not shut off in the previous operating phase through a reset, the system is switched to state 284 "neutral reference run inactive."

In state 284 "neutral reference run inactive," normal driving operation is monitored by the electronic safety system; monitoring of neutral reference run-specific properties by the electronic safety system does not take place in this state.

However, if it was determined in step 282 that the electronic control unit was shut off in the previous operating phase through a reset, the system is switched to state 286 "neutral reference run expected."

In state 286 "neutral reference run expected" the electronic safety system monitors whether a gear change of the transmission unit is performed or initiated. If a gear change is performed or initiated, the electronic safety system produces an error response.

If it is ascertained in state 284 "neutral reference run inactive" that an implausible position of the transmission unit exists, the system is switched to state 286 "neutral reference run expected."

If it is ascertained in state 284 "neutral reference run inactive" that a neutral reference run is being started using the function level, and that according to a predefined characteristic there is a low level of confidence in regard to the present reference position, the system is switched to state 288 "neutral reference run necessarily active."

In state 288 "neutral reference run necessarily active," the electronic safety system checks whether the clutch unit is completely disengaged and conducts a plausibility assessment in regard to the outcome of the neutral reference run. If it turns out as a result that the clutch unit is not completely disengaged or the outcome or result of the neutral reference run is not plausible, the electronic safety system produces an error response.

If it is ascertained in state 284 "neutral reference run inactive" that a neutral reference run is being started using the function level, and that according to a predefined characteristic there is a high level of confidence in regard to the present reference position, the system is switched to state 290 "neutral reference run cyclically active."

In state 290 "neutral reference run cyclically active," the electronic safety system expects that the clutch unit will be kept completely disengaged; the neutral reference run is conducted for the purpose of verifying the reference position, and may be interrupted at any time. If it is ascertained that the clutch unit is not being kept completely disengaged, an error response is triggered by the electronic safety system.

If it is ascertained in state 286 "neutral reference run expected" that a neutral reference run is being started using the function level, the system is switched to state 286 "neutral reference run necessarily active."

If it is ascertained in state 290 "neutral reference run cyclically active" that the function level is ending the neutral reference run without a matching, the system is switched to state 284 "neutral reference run inactive."

If it is ascertained in state 290 "neutral reference run cyclically active" that the function level is ending the neutral reference run with a matching, the system is switched to state 292 "match transmission positions."

In state 292 "match transmission positions," the electronic safety system—like the normal transmission controller—reassigns the incremental distance measuring to the transmission positions.

If it is ascertained in state 288 "neutral reference run necessarily active" that the function level is ending there being a sufficient degree of confidence and after adequate movement of the transmission selector lever, the system is switched to state 292 "match transmission positions."The determination of an adequate level of confidence and an adequate movement of the transmission selector lever in this sense is made according to a predefined characteristic.

If it is ascertained in state 292 "match transmission positions" that the transmission positions are matched, the system is switched to state 284 "neutral reference run inactive."

Figure 13:
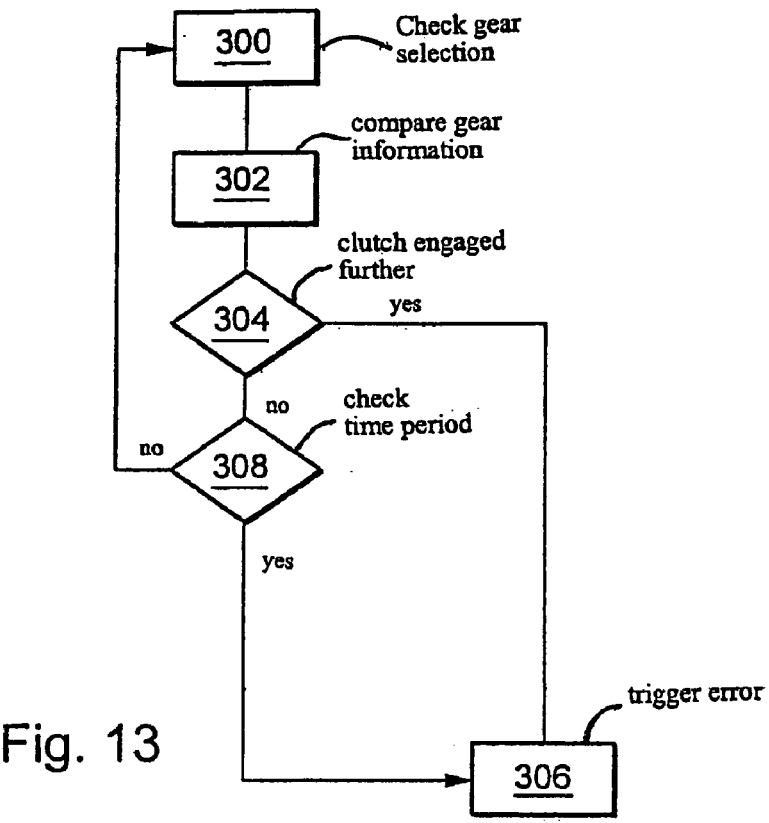
FIG. 13 shows the steps of an exemplary method according to the present invention in schematic representation.

FIG. 13 shows the steps of an exemplary method according to the present invention in schematic representation.

In step 300 the electronic safety system checks whether a forward gear or a reverse gear is selected in the transmission unit.

In step 302 the electronic safety system compares the gear information according to step 300 with the gear information that is reported by a display, and which was determined by a gear detection device (an additional one, in particular in one that is independent of the electronic safety system).

If it turns out that the reverse gear is indicated in the display, and it was determined in step 300 that a forward gear is selected, or vice versa, step 304 determines whether the clutch unit of the motor vehicle is being engaged further. If it is ascertained that the clutch unit is being further or increasingly engaged, an error response is triggered in step 306.

However, if it turns out in the check according to step 304 that the clutch unit is not being engaged further, step 308 checks whether the time period that has elapsed since the first detection of the (momentarily) contradictory gear indication information is greater than a predefined limiting time period.

If that is the case, an error response 306 is triggered.

However, if that is not the case, a check is performed to determine whether the contradictory gear information continues to exist.

Figure 14:
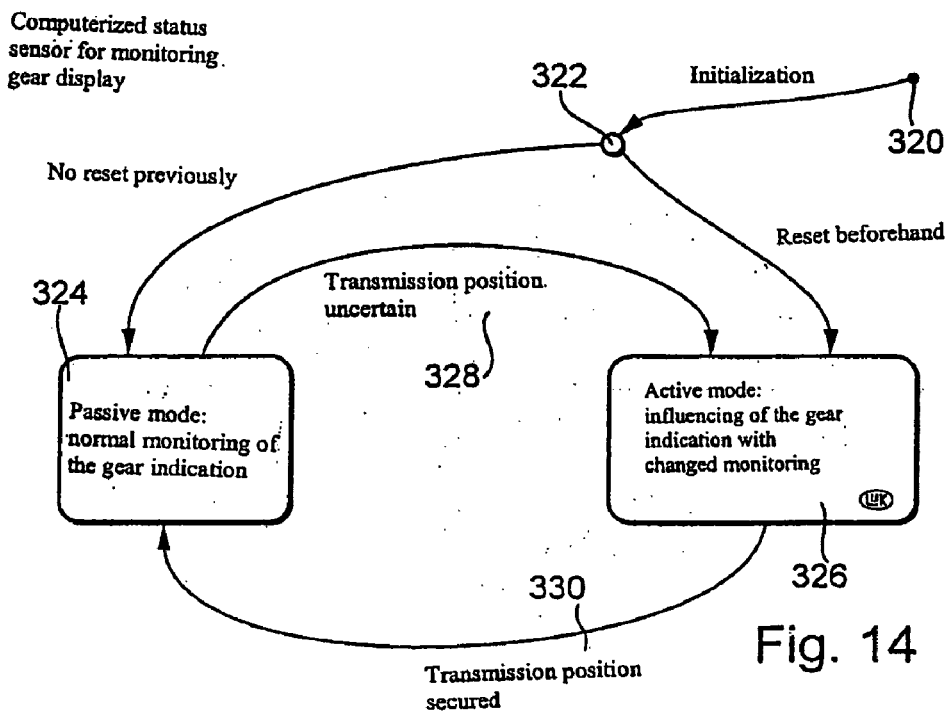
FIG. 14 shows the steps of an exemplary method according to the present invention in schematic representation.

FIG. 14 shows the steps of an exemplary method according to the present invention in schematic representation.

In step 320 the initialization of a control unit is started.

Step 322 checks whether the control unit was shut off in the last operating phase through a reset.

If it is determined in step 322 that the control unit was not shut off in the previous operating phase through a reset, the electronic safety system is switched to a passive mode 324.

In the passive mode a normal monitoring of the gear indication is performed.

However, if it was determined in step 322 that the electronic control unit was shut off in the previous operating phase through a reset, the electronic safety system is switched to the active mode 326. In the active mode 326 the gear indication is influenced by the electronic safety system.

If it is determined in the passive mode 324 that the transmission position is uncertain—as indicated schematically by the reference symbol 328—i.e., in particular that there is not sufficient certainty—according to a predefined model—in regard to the indicated transmission position or gear setting, the system is switched to the active mode.

If it is ascertained in active mode in step 330 that the transmission position is secured, the system is switched to passive mode.

Figure 15:
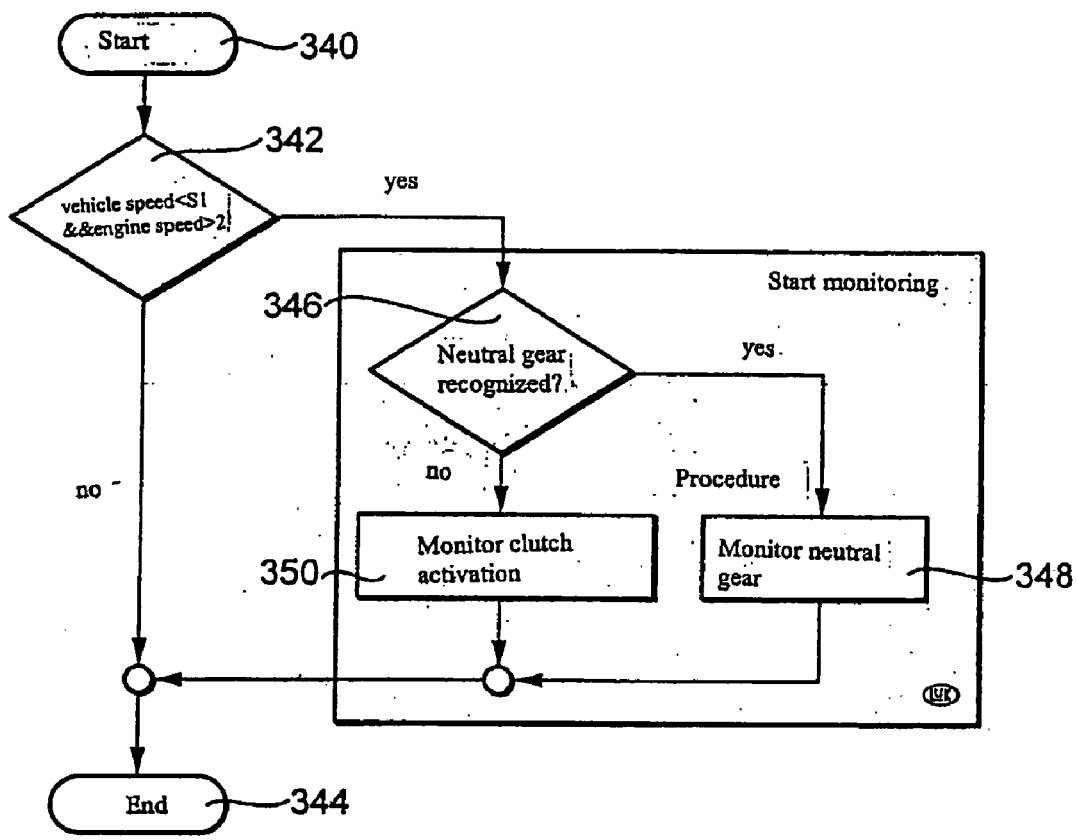
FIG. 15 shows the steps of an exemplary method according to the present invention in schematic representation.

FIG. 15 shows the steps of an exemplary method according to the present invention in schematic representation. The method according to FIG. 15 is in particular a procedure which may be performed by an electronic safety system for start monitoring. The procedure is started in step 340.

Step 342 checks whether the vehicle speed is lower than a predefined limit for the vehicle speed, and the engine speed is greater than a predefined limit for the engine speed.

If at least one of these conditions is not met, the procedure in step 344 is ended.

But if both of these conditions are met, step 346 checks whether the neutral gear is selected or recognized.

If neutral gear is detected or recognized in step 346, in step 348 the neutral gear is monitored.

However, if it is ascertained in step 346 that neutral gear is not selected or is not recognized, in step 350 the clutch controller is monitored.

Figure 16:
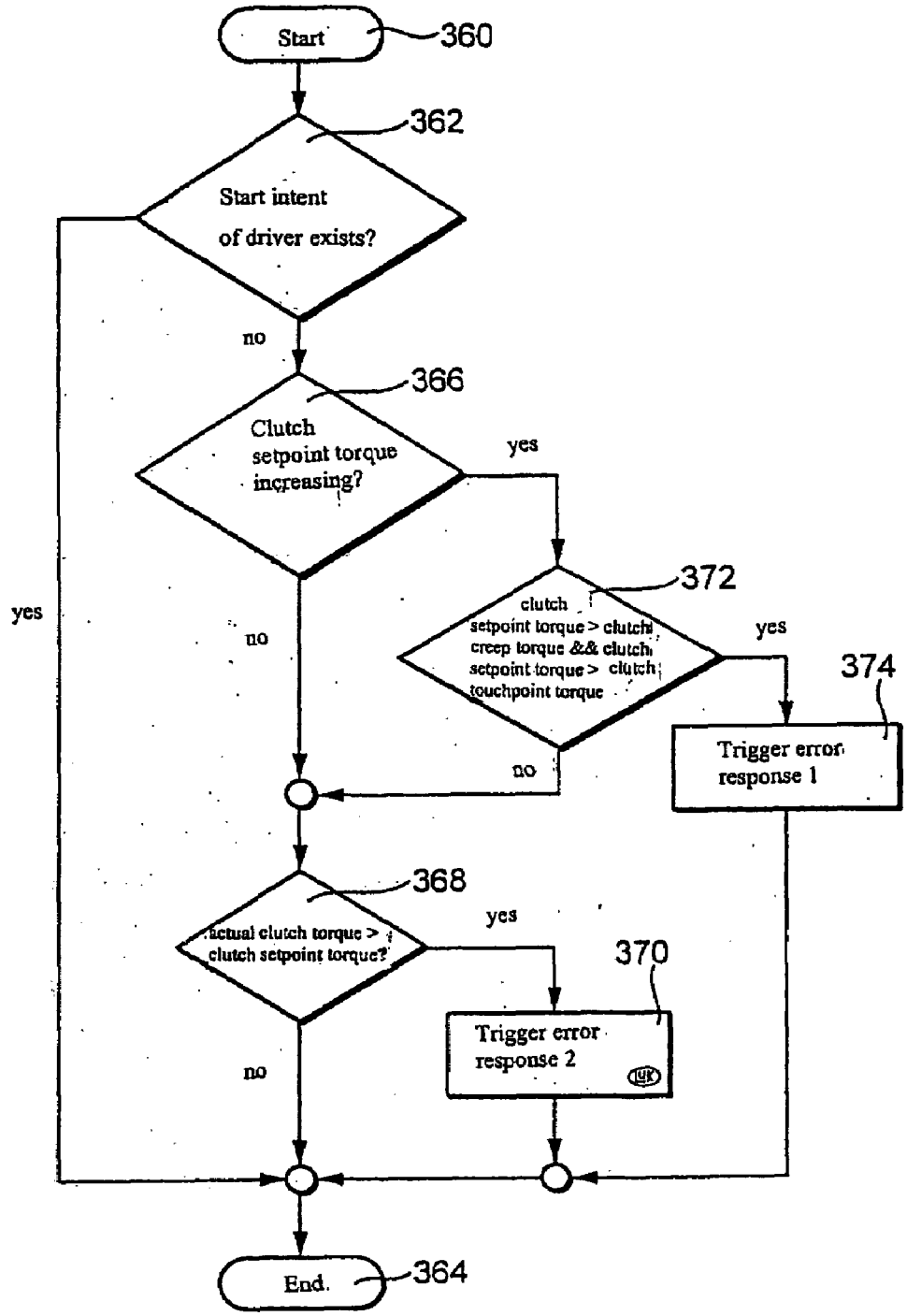
FIG. 16 shows the steps of an exemplary method according to the present invention in schematic representation.

FIG. 16 shows steps of an exemplary method according to the present invention in schematic representation;

The method according to FIG. 16 may be used for example to monitor clutch actuation in the method according to FIG. 15 (e.g. step 350 in the design according to FIG. 15).

The procedure is started in step 360.

Step 362 checks whether a start intent of the driver exists. This may be decided for example on the basis of the accelerator position or an idle switch. It is also preferred for the combination of these two options to exist.

If it is ascertained in the check according to step 362 that a start intent of the driver exists, the procedure in step 364 is ended.

However, if it is ascertained in step 362 that no start intent of the driver exists, step 366 checks whether the setpoint clutch torque of a clutch unit, in particular the start clutch unit, is rising or being increased.

If it turns out in step 366 that the setpoint clutch torque is not rising or being increasingly built up, step 368 checks whether the actual clutch torque is greater than the setpoint clutch torque.

If the actual clutch torque is not greater than the setpoint clutch torque, the procedure in step 364 is ended.

However, if it turns out in step 368 that the actual clutch torque is greater than the setpoint clutch torque, in step 370 an error response is triggered and the procedure is then ended in step 364.

However, if it was ascertained in step 366 that the setpoint clutch torque is rising or increasing, step 372 checks whether the setpoint clutch torque is greater than the creep torque of the clutch, and whether the setpoint clutch torque is greater than the measuring torque of the clutch. The measuring torque of the clutch in particular is a predefined torque which is small, for example 0.5 Nm or 5 Nm, and at which the touch point may be determined or exists.

If it is determined in step 372 that the setpoint clutch torque is not greater than the creep torque and the measuring torque, the process is continued in step 368.

However, if it is ascertained in step 372 that the setpoint clutch torque is greater than the creep torque and greater than the measuring torque, in step 374 an error response is triggered and the procedure is then ended in step 364.

Figure 17:
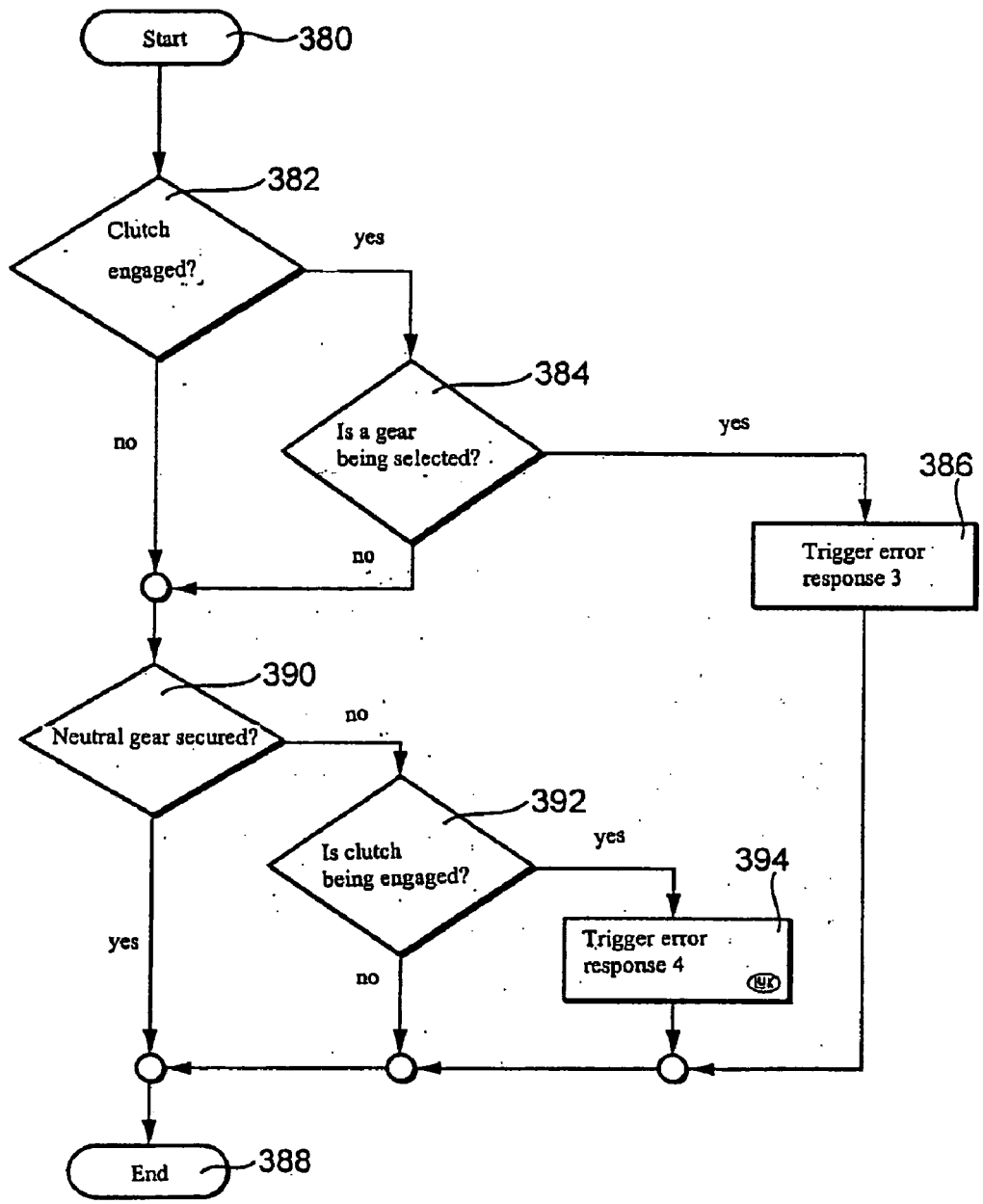
FIG. 17 shows the steps of an exemplary method according to the present invention in schematic representation.

FIG. 17 shows the steps of an exemplary method according to the present invention in schematic representation.

The method according to FIG. 17 may be used in a preferred design in conjunction with the start monitoring of an electronic safety system to monitor the neutral gear (e.g., step 348 in the design according to FIG. 15).

The procedure is started in step 380.

Step 382 checks whether the clutch unit of the motor vehicle, for example the start clutch, is engaged.

If it is ascertained in step 382 that the clutch unit is engaged, step 384 checks whether a gear is selected in the transmission unit.

If it is ascertained in step 384 that a gear is selected in the transmission unit, in step 386 an error response is triggered and the procedure is then ended in step 388.

If it is ascertained in step 382 that the clutch unit is not engaged, or if it is ascertained in step 384 that a gear is not selected in the transmission unit, step 390 checks whether the neutral gear is secured. It may be provided here in particular that a predefined tentative movement is carried out, which determines whether the neutral gear is selected. This may be for example a tentative movement of a type such that with an H shifting pattern in the direction of the gear alleys, in particular in the respective orientations, a switching element is addressed and a check is performed to determine how great the interval is between stops that limit the movement in both orientations of the gear alley unit. If necessary, it is possible to switch back to the starting position. In the event that it is ascertained that the mobility in the gear alley direction is greater than the selection alley width, it is possible to check whether the shifting element is movable in the direction of the selection alley by more than the gear alley width.

Alternatively, it is also possible for example to first check the movability in the direction of the selection alley, and in the event that this is greater than the width of the gear alleys, to ascertain that the neutral gear is securely selected.

It should be remarked, however, that other possibilities may also be used, which permit a check of whether the neutral gear is secured.

If it is ascertained in step 390 that the neutral gear is not secured, step 392 checks whether the clutch unit is engaged.

If it turns out in this test that the clutch unit is not engaged, procedure 388 is ended.

However, if it turns out in the check according to step 392 that the clutch unit is engaged, in step 394 an error response is triggered and the procedure is then ended in step 388.

The patent claims filed with the application are formulation proposals without prejudice of the achievement of broader patent protection. The applicant reserves the right to claim additional feature combinations previously only disclosed in the description and/or the drawing.

The back-references used in the subclaims indicate further refinements of the object of the main claim by the features of the particular subclaim. They are not to be understood as a waiver of obtaining an independent claim for the combination of features of the back-referenced subclaims.

Because the objects of the subclaims may form separate independent inventions with respect to the related art on the priority date, the applicant reserves the right to make them the object of independent claims or division clarifications. They may furthermore also contain independent inventions having a design that is independent of the objects of the aforementioned subclaims.

The exemplary embodiments are not to be understood as limitations of the present invention. Rather, numerous modifications and variants are possible within the present disclosure, in particular variants, elements, and combinations and/or materials that are obvious to those skilled in the art regarding the achievement of the object of the present invention, for example, by combination or modification of individual features or elements or method steps described in the general description and embodiments as well as in the claims and contained in the drawing, resulting in a new object or new method steps or method step sequences via combinable features, including those concerning manufacturing, testing, and work methods.

Figure 18:
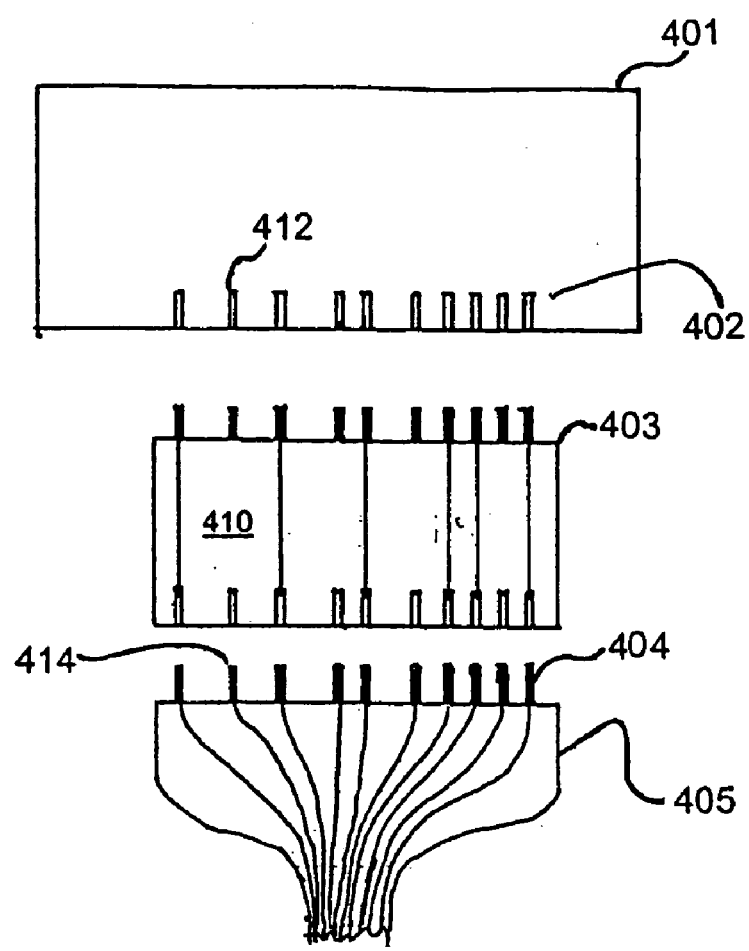
FIG. 18 shows an adapter connector for connecting a wire harness plug connector with a control unit connector.

FIG. 18 shows an adapter connector 403 for connecting a wire harness plug connector 404 with a control unit connector 402. Adapter connector 403 is configured to couple directly with the wire harness plug connector 404 and the control unit connector 402 and to switch predefined electrical signal connections between a control unit 401 and a wire harness 405. Adapter connector 403 is configured to enable the electronic control unit 401 to work together with an electronic safety system that has a redundant processor. Adapter connector 403 is connectable between the wire harness plug connector 404 and the control unit connector 402 in such a way that the adapter plug 403 is coupled with both the wire harness plug connector 404 and the control unit connector 402 via plug connections. The adapter connector 403 at section 410 for example interrupts at least a portion of a plurality of electrical signal connections between the wire harness plug connector 404 and the control unit connector 402 for example between connections 412 and 414.

What is claimed is:

1. A method for controlling an automated gearbox of a motor vehicle, comprising:
providing an electronic control unit having a main processor;
controlling a predefined functionality of the automated gearbox using a function software running on the main processor under predefined conditions;
detecting a safety-critical operating state of the motor vehicle in advance using an electronic safety system having a redundant processor, a monitoring software and a plurality of function blocks, each function block having a signal input and a signal output.

2. The method as recited in claim 1 wherein the plurality of function blocks of the electronic safety system includes a first function block check of whether a predefined input signal describes an operating state of at least one of the motor vehicle, a clutch unit, and a transmission unit in a plausible way.

3. The method as recited in claim 1 wherein the plurality of function blocks includes a signal plausibility check function block.

4. The method as recited in claim 3 wherein the plurality of function blocks includes a situation recognition function block.

5. The method as recited in claim 4 wherein the plurality of function blocks includes an action monitoring function block.

6. The method as recited in claim 5 wherein the plurality of function blocks includes an actuator monitoring function block.

7. The method as recited in claim 6 wherein the plurality of function blocks includes an error handling function block.

8. The method as recited in claim 1 wherein the plurality of function blocks includes a situation recognition function block.

9. The method as recited in claim 1 wherein the plurality of function blocks includes an action monitoring function block.

10. The method as recited in claim 1 wherein the plurality of function blocks includes an actuator monitoring function block.

11. The method as recited in claim 1 wherein the plurality of function blocks includes an error handling function block.

12. An electronic safety system for motor vehicles, wherein the electronic safety system is of modular design and has a plurality of function blocks, each function block having a signal input and a signal output,
wherein the plurality of function blocks includes a signal plausibility check function block,
wherein the plurality of function blocks includes a situation recognition function block.

13. The electronic safety system as recited in claim 12 wherein the plurality of function blocks includes an action monitoring function block.

14. The electronic safety system as recited in claim 13 wherein the plurality of function blocks includes an actuator monitoring function block.

15. The electronic safety system as recited in claim 14 wherein the plurality of function blocks includes an error handling function block.

16. An adapter connector for connecting a wire harness plug connector with a control unit connector of an electronic control unit, the wire harness plug connector being directly connectable with the control unit connector to define electrical signal connections, the adaptor connector comprising:
first plug connections connecting directly to the control unit connector and second plug connections connecting directly to the wire harness plug connector, the adaptor electrically connecting at least one of the first plug connections to the second plug connections to provide at least one of the electrical signal connections;
the adapter connector being configured to enable the electronic control unit to work together with an electronic safety system that has a redundant processor;
at least one other of the first plug connections being electrically isolated from the second plug connections so that the adaptor connector interrupts at least one of the electrical signal connections provided when the wire harness plug connector is directly connected to the control unit connector.

* * * * *